US012428805B2

(12) United States Patent
Misaki et al.

(10) Patent No.: US 12,428,805 B2
(45) Date of Patent: Sep. 30, 2025

(54) SHOVEL

(71) Applicant: SUMITOMO CONSTRUCTION MACHINERY CO., LTD., Tokyo (JP)

(72) Inventors: Youji Misaki, Chiba (JP); Ryuji Shiratani, Chiba (JP)

(73) Assignee: SUMITOMO CONSTRUCTION MACHINERY CO., LTD., Tokyo (JP)

(*) Notice: Subject to any disclaimer, the term of this patent is extended or adjusted under 35 U.S.C. 154(b) by 522 days.

(21) Appl. No.: 17/447,819

(22) Filed: Sep. 16, 2021

(65) Prior Publication Data

US 2022/0002965 A1 Jan. 6, 2022

Related U.S. Application Data

(63) Continuation of application No. PCT/JP2020/012257, filed on Mar. 19, 2020.

(30) Foreign Application Priority Data

Mar. 19, 2019 (JP) ................................ 2019-051406

(51) Int. Cl.
*E02F 3/43* (2006.01)
*E02F 3/32* (2006.01)
(Continued)

(52) U.S. Cl.
CPC ................ *E02F 3/435* (2013.01); *E02F 3/32* (2013.01); *E02F 3/425* (2013.01); *E02F 9/123* (2013.01);
(Continued)

(58) Field of Classification Search
CPC ... E02F 3/435; E02F 3/32; E02F 3/425; E02F 9/123; E02F 9/2228; E02F 9/2285;
(Continued)

(56) References Cited

U.S. PATENT DOCUMENTS 5,692,377 A * 12/1997 Moriya ................. E02F 9/2242 60/427
5,813,311 A * 9/1998 Toyooka ............... E02F 9/2228 91/516

(Continued)

FOREIGN PATENT DOCUMENTS

JP H09-177136 7/1997
JP H09-279637 10/1997

(Continued)

OTHER PUBLICATIONS

JP2014038127 Machine translation (Year: 2014).*

(Continued)

*Primary Examiner* — Fadey S. Jabr
*Assistant Examiner* — Mark Robert Heim
(74) *Attorney, Agent, or Firm* — IPUSA, PLLC

(57) ABSTRACT

A shovel includes a lower traveling structure, an upper swing structure swingably mounted on the lower traveling structure, a first hydraulic pump provided on the upper swing structure, an attachment attached to the upper swing structure, a first actuator, a second actuator, a first directional control valve corresponding to the first actuator, a second directional control valve corresponding to the second actuator, a first conduit connecting the first hydraulic pump and the first directional control valve, a second conduit connecting the first conduit and the second directional control valve, a control valve installed in the second conduit, and processing circuitry configured to control the opening area of the control valve according to information on work details.

14 Claims, 10 Drawing Sheets

(51) Int. Cl.

| | |
|---|---|
| ***E02F 3/42*** | (2006.01) |
| ***E02F 9/12*** | (2006.01) |
| ***E02F 9/22*** | (2006.01) |
| ***E02F 9/26*** | (2006.01) |
| ***F15B 15/20*** | (2006.01) |

(52) U.S. Cl.

CPC .......... *E02F 9/2228* (2013.01); *E02F 9/2285* (2013.01); *E02F 9/2292* (2013.01); *E02F 9/264* (2013.01); *F15B 15/202* (2013.01); *E02F 9/2267* (2013.01); *E02F 9/2271* (2013.01); *E02F 9/2275* (2013.01); *E02F 9/2296* (2013.01)

(58) Field of Classification Search

CPC ....... E02F 9/2292; E02F 9/264; E02F 9/2267; E02F 9/2271; E02F 9/2275; E02F 9/2296; E02F 9/22; E02F 9/2225; F15B 15/202; F15B 2211/6309; F15B 2211/31582; F15B 11/162; F15B 11/17; F15B 2211/20546; F15B 2211/20576; F15B 2211/30565; F15B 2211/3111; F15B 2211/3116; F15B 2211/6652; F15B 2211/7142; F15B 2211/40515; F15B 2211/426; F15B 2211/455; F15B 2211/6333; F15B 2211/6346; F15B 2211/7135; F15B 2211/781; F15B 11/02; F15B 2211/6654; F15B 2211/7058; F15B 2211/6306; F15B 2211/41509; F15B 2211/413; F15B 2211/633

See application file for complete search history.

(56) References Cited

U.S. PATENT DOCUMENTS

| | | | | |
|---|---|---|---|---|
| 10,030,355 | B2 * | 7/2018 | Yamashita | E02F 9/2271 |
| 2008/0245065 | A1 * | 10/2008 | Nakamura | F02D 41/021<br>60/426 |
| 2008/0250782 | A1 * | 10/2008 | Takeshita | E02F 9/2225<br>60/420 |
| 2011/0276212 | A1 * | 11/2011 | Wu | B60W 10/30<br>903/902 |
| 2012/0315119 | A1 * | 12/2012 | Magaki | E02F 3/43<br>414/815 |
| 2013/0255243 | A1 * | 10/2013 | Shiratani | E02F 9/2296<br>60/420 |
| 2013/0291530 | A1 * | 11/2013 | Bang | E02F 9/2292<br>60/428 |
| 2013/0341133 | A1 * | 12/2013 | Sano | E02F 9/20<br>188/105 |
| 2013/0345939 | A1 * | 12/2013 | Magaki | E02F 9/2075<br>701/50 |
| 2014/0058607 | A1 * | 2/2014 | Magaki | E02F 9/123<br>701/22 |
| 2014/0107898 | A1 * | 4/2014 | Kawashima | E02F 9/2095<br>701/50 |
| 2014/0241842 | A1 * | 8/2014 | Shiratani | E02F 9/2075<br>414/744.2 |
| 2014/0303855 | A1 * | 10/2014 | Umeda | E02F 9/123<br>701/50 |
| 2015/0059329 | A1 * | 3/2015 | Bae | E02F 9/2235<br>60/420 |
| 2015/0114731 | A1 * | 4/2015 | Tsukamoto | E02F 3/32<br>180/53.8 |
| 2015/0252819 | A1 * | 9/2015 | Imura | E02F 9/2235<br>60/422 |
| 2015/0300378 | A1 * | 10/2015 | Udagawa | E02F 9/2235<br>60/449 |
| 2016/0145836 | A1 * | 5/2016 | Yamada | F02D 29/00<br>701/50 |
| 2016/0356020 | A1 * | 12/2016 | Cho | E02F 9/2292 |
| 2017/0241105 | A1 * | 8/2017 | Yuzawa | F15B 11/08 |
| 2017/0275852 | A1 * | 9/2017 | Yamashita | F15B 11/08 |
| 2017/0292241 | A1 * | 10/2017 | Magaki | F02D 29/00 |
| 2018/0002895 | A1 * | 1/2018 | Misaki | F02D 29/04 |
| 2018/0305899 | A1 * | 10/2018 | Kawaguchi | F15B 11/165 |
| 2019/0186105 | A1 * | 6/2019 | Imura | E02F 9/22 |
| 2019/0194908 | A1 * | 6/2019 | Ogura | E02F 9/265 |
| 2019/0271333 | A1 * | 9/2019 | Kondo | E02F 9/2235 |
| 2019/0284782 | A1 * | 9/2019 | Izumikawa | F15B 11/10 |
| 2019/0390444 | A1 | 12/2019 | Misaki | |
| 2020/0040917 | A1 * | 2/2020 | Jung | F15B 13/02 |
| 2020/0157764 | A1 * | 5/2020 | Yamamoto | E02F 9/2012 |
| 2020/0158143 | A1 * | 5/2020 | Kondo | F15B 21/087 |
| 2021/0071391 | A1 * | 3/2021 | Takahashi | E02F 9/2296 |
| 2021/0332563 | A1 * | 10/2021 | Kanazawa | E02F 9/2228 |
| 2023/0131384 | A1 * | 4/2023 | Konishi | F15B 13/024<br>60/428 |

FOREIGN PATENT DOCUMENTS

| | | | | | |
|---|---|---|---|---|---|
| JP | 2004225805 | A | * | 8/2004 | |
| JP | 5107200 | B2 | * | 12/2012 | |
| JP | 2014-031827 | | | 2/2014 | |
| JP | 2014031827 | A | * | 2/2014 | |
| JP | 2014-167334 | | | 9/2014 | |
| JP | 5586543 | B2 | * | 9/2014 | E02F 9/2203 |
| JP | 2014167334 | A | * | 9/2014 | |
| JP | 2016176289 | A | * | 10/2016 | |
| WO | 2018/164238 | | | 9/2018 | |

OTHER PUBLICATIONS

JP2016176289A machine translation (Year: 2016).*
JP2014167334A machine translation (Year: 2014).*
JP-2004225805-A machine translation (Year: 2014).*
JP-5586543-B2 machine translation (Year: 2004).*
JP-5107200-B2 machine translation (Year: 2012).*
International Search Report for PCT/JP2020/012257 mailed on Jun. 16, 2020.

* cited by examiner

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2020/012257, filed on Mar. 19, 2020 and designating the U.S., which claims priority to Japanese Patent Application No. 2019-051406, filed on Mar. 19, 2019. The entire contents of the foregoing applications are incorporated herein by reference.

BACKGROUND

Technical Field

The present disclosure relates to shovels.

Description of Related Art

A shovel that increases the flow rate of hydraulic oil flowing into a swing hydraulic motor by reducing the flow rate of hydraulic oil flowing into an arm cylinder when performing excavation with a complex operation including a swing operation and an arm closing operation has been known.

This excavation is typically excavation achieved by closing an arm while pressing the side of a bucket against an object of excavation (also referred to as "swing and press excavation").

This shovel can prevent the pressing force generated by the swing hydraulic motor from being insufficient by supplying hydraulic oil preferentially to the swing hydraulic motor. Therefore, an operator of this shovel can smoothly perform such excavation as described above.

SUMMARY

According to an aspect of the present invention, a shovel includes a lower traveling structure, an upper swing structure swingably mounted on the lower traveling structure, a first hydraulic pump provided on the upper swing structure, an attachment attached to the upper swing structure, a first actuator, a second actuator, a first directional control valve corresponding to the first actuator, a second directional control valve corresponding to the second actuator, a first conduit connecting the first hydraulic pump and the first directional control valve, a second conduit connecting the first conduit and the second directional control valve, a control valve installed in the second conduit, and processing circuitry configured to control the opening area of the control valve according to information on work details.

DETAILED DESCRIPTION

The related-art shovel may reduce the flow rate of hydraulic oil flowing into the arm cylinder to destabilize the motion of the arm when a complex operation including a swing operation and an arm closing operation is performed without the side of the bucket contacting an object of excavation as well.

Therefore, it is desired to stabilize the motion of a shovel when a complex operation including a swing operation is performed.

According to an embodiment of the present invention, it is possible to stabilize the motion of a shovel when a complex operation including a swing operation is performed.

Figure 1:
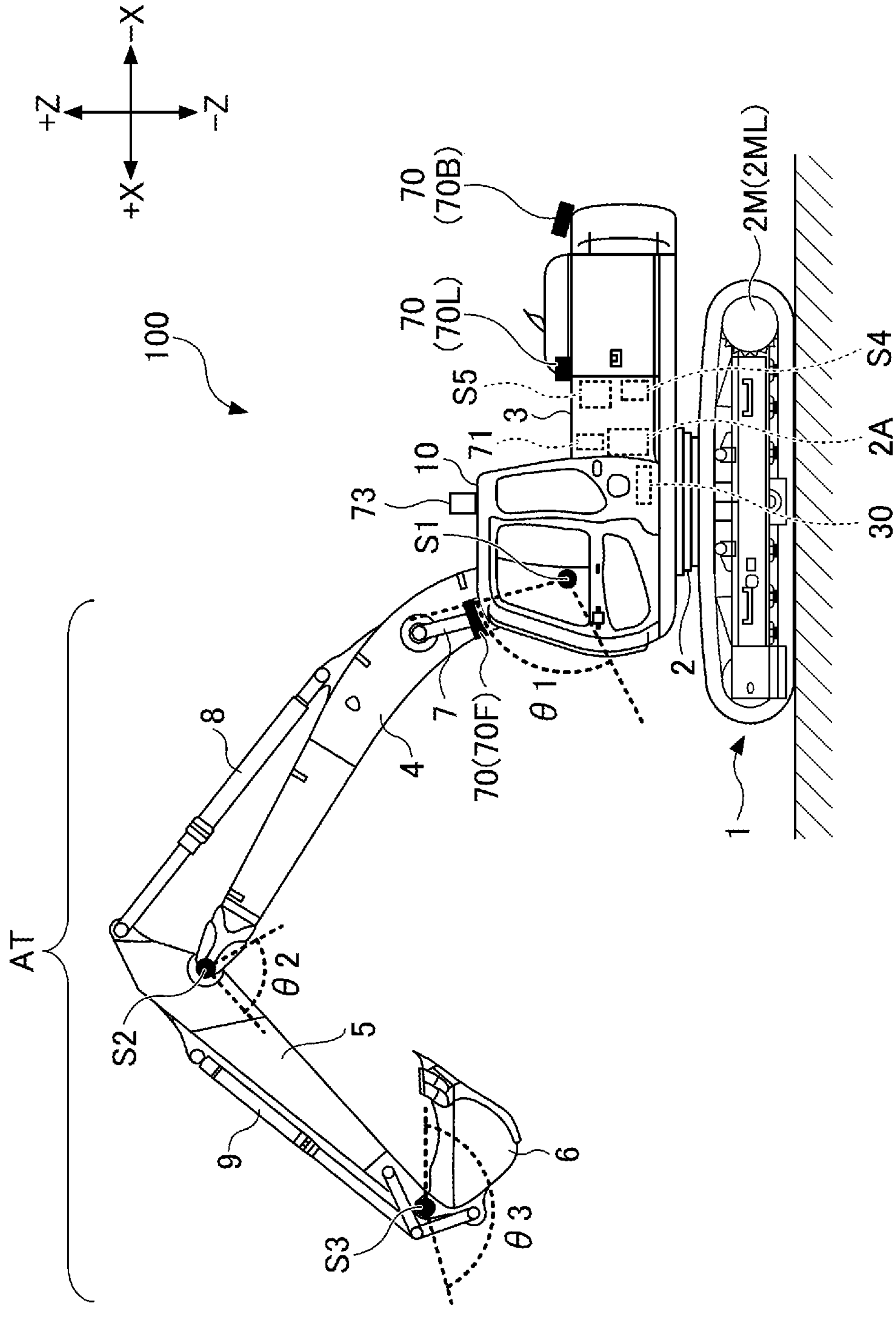
FIG. 1 is a side view of a shovel according to an embodiment of the present invention.
Figure 2:
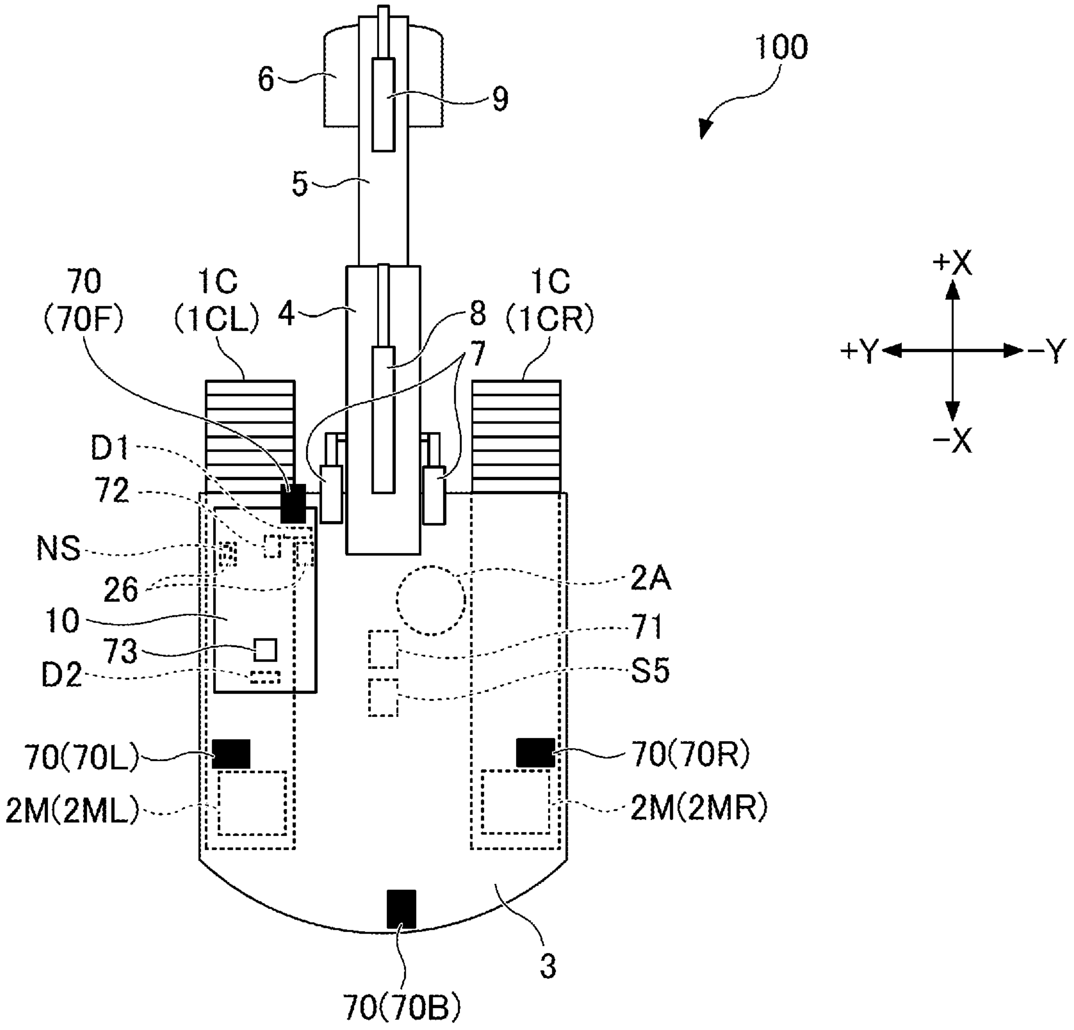
FIG. 2 is a plan view of the shovel of FIG. 1.

First, a shovel 100 serving as an excavator according to an embodiment of the present invention is described with reference to FIGS. 1 and 2. FIG. 1 is a side view of the shovel 100. FIG. 2 is a plan view of the shovel 100.

According to this embodiment, a lower traveling structure 1 of the shovel 100 includes crawlers 1C. The crawlers 1C are driven by travel hydraulic motors 2M serving as travel actuators mounted on the lower traveling structure 1. Specifically, the crawlers 1C include a left crawler 1CL and a right crawler 1CR. The left crawler 1CL is driven by a left travel hydraulic motor 2ML. The right crawler 1CR is driven by a right travel hydraulic motor 2MR.

An upper swing structure 3 is swingably mounted on the lower traveling structure 1 via a swing mechanism 2. The swing mechanism 2 is driven by a swing hydraulic motor 2A serving as a swing actuator mounted on the upper swing structure 3.

A boom 4 is attached to the upper swing structure 3. An aim 5 is attached to the distal end of the boom 4. A bucket 6 serving as an end attachment is attached to the distal end of the arm 5. The boom 4, the arm 5, and the bucket 6 constitute an excavation attachment AT that is an example of an attachment. The boom 4 is driven by a boom cylinder 7. The arm 5 is driven by an arm cylinder 8. The bucket 6 is driven by a bucket cylinder 9. The boom cylinder 7, the arm cylinder 8, and the bucket cylinder 9 constitute an attachment actuator.

The boom 4 is supported to be pivotable upward and downward relative to the upper swing structure 3. A boom angle sensor S1 is attached to the boom 4. The boom angle sensor S1 can detect a boom angle θ1 that is the pivot angle of the boom 4. The boom angle θ1 is, for example, a rise angle from the lowest position of the boom 4. Therefore, the boom angle θ1 is maximized when the boom 4 is raised most.

The arm 5 is pivotably supported relative to the boom 4. An arm angle sensor S2 is attached to the arm 5. The arm angle sensor S2 can detect an arm angle θ2 that is the pivot angle of the arm 5. The arm angle θ2 is, for example, an opening angle from the most closed position of the arm 5. Therefore, the arm angle θ2 is maximized when the arm 5 is opened most.

The bucket 6 is pivotably supported relative to the arm 5. A bucket angle sensor S3 is attached to the bucket 6. The bucket angle sensor S3 can detect a bucket angle θ3 that is the pivot angle of the bucket 6. The bucket angle θ3 is, for example, an opening angle from the most closed position of the bucket 6. Therefore, the bucket angle θ3 is maximized when the bucket 6 is opened most.

According to the embodiment of FIG. 1, each of the boom angle sensor S1, the arm angle sensor S2, and the bucket angle sensor S3 is composed of a combination of an acceleration sensor and a gyroscope, but may also be composed of an acceleration sensor alone. Furthermore, the boom angle sensor S1 may also be a stroke sensor attached to the boom cylinder 7, a rotary encoder, a potentiometer, an inertial measurement unit, or the like. The same is true for the arm angle sensor S2 and the bucket angle sensor S3.

A cabin 10 serving as a cab is provided and a power source such as an engine 11 is mounted on the upper swing structure 3. Furthermore, a space recognition device 70, an orientation detector 71, a positioning device 73, a machine body tilt sensor S4, a swing angular velocity sensor S5, etc., are attached to the upper swing structure 3. An operating device 26, a controller 30, an information input device 72, a display D1, a sound output device D2, etc., are provided in the cabin 10. In this specification, for convenience, the side of the upper swing structure 3 on which the excavation attachment AT is attached is referred to as the front side, and the side of the upper swing structure 3 on which a counterweight is attached is referred to as the back side.

The space recognition device 70 is configured to recognize an object present in a three-dimensional space surrounding the shovel 100. Furthermore, the space recognition device 70 is configured to calculate a distance from the space recognition device 70 or the shovel 100 to the recognized object. Examples of the space recognition device 70 include an ultrasonic sensor, a millimeter wave radar, a monocular camera, a stereo camera, a LIDAR, a distance image sensor, and an infrared sensor. According to the example illustrated in FIGS. 1 and 2, the space recognition device 70 includes a front sensor 70F attached to the front end of the upper surface of the cabin 10, a back sensor 70B attached to the back end of the upper surface of the upper swing structure 3, a left sensor 70L attached to the left end of the upper surface of the upper swing structure 3, and a right sensor 70R attached to the right end of the upper surface of the upper swing structure 3. An upper sensor that recognizes an object present in a space above the upper swing structure 3 may be attached to the shovel 100.

The orientation detector 71 detects information on the relative relationship between the orientation of the upper swing structure 3 and the orientation of the lower traveling structure 1. The orientation detector 71 may be constituted of, for example, a combination of a geomagnetic sensor attached to the lower traveling structure 1 and a geomagnetic sensor attached to the upper swing structure 3. The orientation detector 71 may also be constituted of a combination of a GNSS receiver attached to the lower traveling structure 1 and a GNSS receiver attached to the upper swing structure 3. The orientation detector 71 may also be a rotary encoder, a rotary position sensor, or the like. According to a configuration where the upper swing structure 3 is driven to swing by a swing motor generator, the orientation detector 71 may be constituted of a resolver. The orientation detector 71 may be attached to, for example, a center joint provided in relation to the swing mechanism 2 that achieves relative rotation between the lower traveling structure 1 and the upper swing structure 3.

The orientation detector 71 may also be constituted of a camera attached to the upper swing structure 3. In this case, the orientation detector 71 performs known image processing on an image captured by the camera attached to the upper swing structure 3 (an input image) to detect an image of the lower traveling structure 1 included in the input image. The orientation detector 71 may identify the longitudinal direction of the lower traveling structure 1 by detecting an image of the lower traveling structure 1 using a known image recognition technique and derive an angle formed between the direction of the longitudinal axis of the upper swing structure 3 and the longitudinal direction of the lower traveling structure 1. The direction of the longitudinal axis of the upper swing structure 3 is derived from the attachment position of the camera. Because the crawlers 1C protrude from the upper swing structure 3, the orientation detector 71 can identify the longitudinal direction of the lower traveling structure 1 by detecting an image of the crawlers 1C. In this case, the orientation detector 71 may be integrated into the controller 30.

The information input device 72 is configured to enable the shovel operator to input information to the controller 30. According to this embodiment, the information input device 72 is a switch panel installed near the display part of the display D1. The information input device 72, however, may also be a touchscreen placed over the display part of the display D1 or a sound input device such as a microphone placed in the cabin 10. Furthermore, the information input device 72 may also be a communications device. In this case, the operator can input information to the controller 30 via a communications terminal such as a smartphone.

The positioning device 73 is configured to measure a current position. According to this embodiment, the positioning device 73 is a GNSS receiver, and detects the position of the upper swing structure 3 to output a detection value to the controller 30. The positioning device 73 may also be a GNSS compass. In this case, the positioning device 73 can detect the position and the orientation of the upper swing structure 3.

The machine body tilt sensor S4 is configured to detect the tilt of the upper swing structure 3 relative to a predetermined plane. According to this embodiment, the machine body tilt sensor S4 is an acceleration sensor that detects the tilt angles of the upper swing structure 3 about its longitudinal axis and lateral axis relative to a horizontal plane. The longitudinal axis and the lateral axis of the upper swing structure 3, for example, pass through a shovel central point that is a point on the swing axis of the shovel 100, crossing each other at right angles.

The swing angular velocity sensor S5 is configured to detect the swing angular velocity of the upper swing structure 3. According to this embodiment, the swing angular velocity sensor S5 is a gyroscope. The swing angular velocity sensor S5 may also be a resolver, a rotary encoder, or the like. The swing angular velocity sensor S5 may also detect swing speed. The swing speed may be calculated from swing angular velocity.

In the following, at least one of the boom angle sensor S1, the arm angle sensor S2, the bucket angle sensor S3, the machine body tilt sensor S4, and the swing angular velocity sensor S5 is also referred to as "pose detector." The pose of the excavation attachment AT is detected based on the respective outputs of the boom angle sensor S1, the arm angle sensor S2, and the bucket angle sensor S3, for example.

The display D1 is a device that displays information. According to this embodiment, the display D1 is a liquid crystal display installed in the cabin 10. The display D1 may also be the display of a communications terminal such as a smartphone.

The sound output device D2 is a device that outputs a sound. The sound output device D2 includes at least one of a device that outputs a sound to the operator in the cabin 10 and a device that outputs a sound to a worker outside the cabin 10. The sound output device D2 may be a loudspeaker of a communications terminal.

The operating device 26 is a device that the operator uses to operate actuators. The operating device 26 is installed in the cabin 10 to be usable by the operator seated in the operator seat.

The controller 30 (control device) is processing circuitry configured to control the shovel 100. According to this embodiment, the controller 30 is constituted of a computer including a CPU, a RAM, an NVRAM, and a ROM. The controller 30 reads programs corresponding to functional elements such as an information obtaining part 30*a* and a control part 30*b* from the ROM, loads the programs into the RAM, and causes the CPU to execute processes corresponding to the functional elements. Thus, the functional elements are implemented by software. At least one of the functional elements, however, may be implemented by hardware or firmware. The functional elements are distinguished for the convenience of description, but are equally part of the controller 30 and do not have to be configured to be physically distinguishable.

Figure 3:
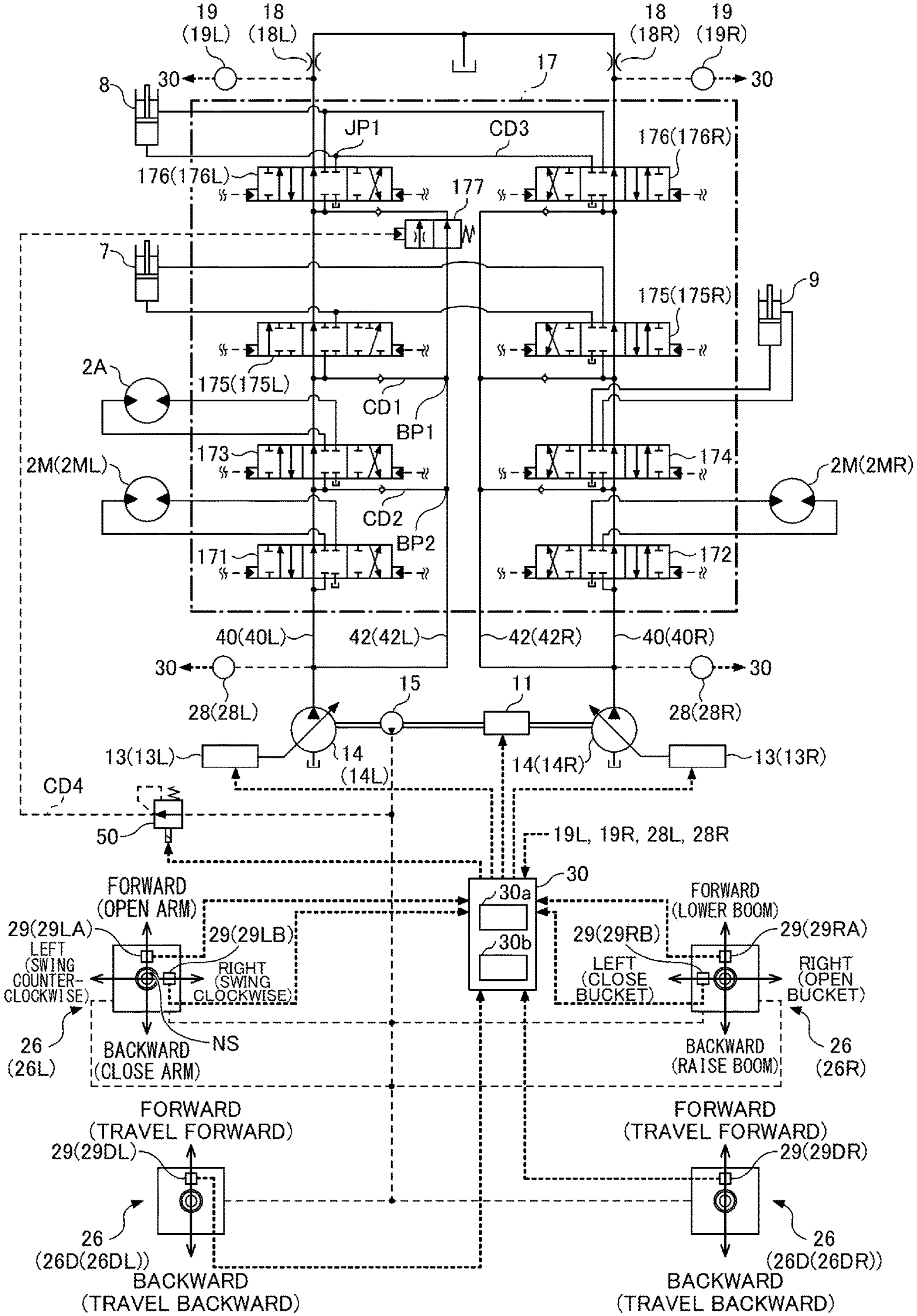
FIG. 3 is a diagram illustrating an example configuration of a hydraulic system installed in the shovel of FIG. 1.

Next, an example configuration of a hydraulic system installed in the shovel 100 is described with reference to FIG. 3. FIG. 3 is a diagram illustrating an example configuration of the hydraulic system installed in the shovel 100. In FIG. 3, a mechanical power transmission system, a hydraulic oil line, a pilot line, and an electrical control system are indicated by a double line, a solid line, a dashed line, and a dotted line, respectively.

The hydraulic system of the shovel 100 mainly includes the engine 11, a regulator 13, a main pump 14, a pilot pump 15, a control valve unit 17, the operating device 26, a discharge pressure sensor 28, an operating pressure sensor 29, the controller 30, and a solenoid valve 50.

Referring to FIG. 3, the hydraulic system is configured to be able to circulate hydraulic oil from the main pump 14 driven by the engine 11 to a hydraulic oil tank via a center bypass conduit 40 or a parallel conduit 42. The center bypass conduit 40 includes a left center bypass conduit 40L and a right center bypass conduit 40R. The parallel conduit 42 includes a left parallel conduit 42L and a right parallel conduit 42R.

The engine 11 is a drive source of the shovel 100. According to this embodiment, the engine 11 is, for example, a diesel engine that operates to maintain a predetermined rotational speed. The output shaft of the engine 11 is connected to the respective input shafts of the main pump 14 and the pilot pump 15.

The main pump 14 is configured to be able to supply hydraulic oil to the control valve unit 17 via a hydraulic oil line. According to this embodiment, the main pump 14 is a swash plate variable displacement hydraulic pump.

The regulator 13 is configured to be able to control the discharge quantity of the main pump 14. According to this embodiment, the regulator 13 controls the discharge quantity of the main pump 14 by adjusting the swash plate tilt angle of the main pump 14 in response to a control command from the controller 30.

The pilot pump 15 is configured to be able to supply hydraulic oil to hydraulic control apparatuses including the operating device 26 via a pilot line. According to this embodiment, the pilot pump 15 is a fixed displacement hydraulic pump. The pilot pump 15 may be omitted. In this case, the function carried by the pilot pump 15 may be implemented by the main pump 14. That is, in addition to the function of supplying hydraulic oil to the control valve unit 17, the main pump 14 may have the function of supplying hydraulic oil to the operating device 26, etc., after reducing the pressure of the hydraulic oil with a throttle or the like.

The control valve unit 17 is a hydraulic controller that controls the hydraulic system in the shovel 100. According to this embodiment, the control valve unit 17 includes directional control valves 171 through 176 and a control valve 177. The directional control valve 175 includes a directional control valve 175L and a directional control valve 175R. The directional control valve 176 includes a directional control valve 176L and a directional control valve 176R. The control valve unit 17 is configured to be able to selectively supply hydraulic oil discharged by the main pump 14 to one or more hydraulic actuators through the directional control valves 171 through 176. The directional control valves 171 through 176 control, for example, the flow rate of hydraulic oil flowing from the main pump 14 to hydraulic actuators and the flow rate of hydraulic oil flowing from hydraulic actuators to the hydraulic oil tank. The hydraulic actuators include the boom cylinder 7, the arm cylinder 8, the bucket cylinder 9, the left travel hydraulic motor 2ML, the right travel hydraulic motor 2MR, and the swing hydraulic motor 2A.

The operating device 26 is a device that the operator uses to operate actuators. The operating device 26 includes, for example, an operating lever and an operating pedal. The actuators include at least one of a hydraulic actuator and an electric actuator. According to this embodiment, the operating device 26 is configured to be able to supply hydraulic oil discharged by the pilot pump 15 to a pilot port of a corresponding directional control valve in the control valve unit 17 via a pilot line. The pressure of hydraulic oil supplied to each pilot port (pilot pressure) is a pressure commensurate with the direction of operation and the amount of operation of the operating device 26 corresponding to each hydraulic actuator. The operating device 26, however, may be an electromagnetic pilot type instead of the above-described hydraulic pilot type. The directional valves in the control valve unit 17 may also be electromagnetic solenoid spool valves. Specifically, an electric operation system including an electric operating lever with an electric pilot circuit may be adopted instead of a hydraulic operation system with such a hydraulic pilot circuit. In this case, the amount of lever operation of the electric operating lever is input to the controller 30 as an electrical signal. Furthermore, a solenoid valve is placed between the pilot pump 15 and a pilot port of each control valve. The solenoid valve is configured to operate in response to an electrical signal from the controller 30. According to this configuration, when a manual operation using the electric operating lever is performed, the controller 30 can move each control valve in the control valve unit 17 by increasing or decreasing a pilot pressure by controlling the solenoid valve with an electrical signal corresponding to the amount of lever operation. Each control valve may be constituted of a solenoid spool valve. In this case, the solenoid spool valve operates in response to an electrical signal from the controller 30 commensurate with the amount of lever operation of the electric operating lever.

The discharge pressure sensor 28 is configured to be able to detect the discharge pressure of the main pump 14. According to this embodiment, the discharge pressure sensor 28 outputs a detected value to the controller 30.

The operating pressure sensor 29 is configured to be able to detect the details of the operator's operation on the operating device 26. According to this embodiment, the operating pressure sensor 29 detects the direction of operation and the amount of operation of the operating device 26 corresponding to each actuator in the form of pressure (operating pressure), and outputs a detected value to the controller 30. The details of the operation of the operating device 26 may also be detected using a sensor other than an operating pressure sensor.

The main pump 14 includes a left main pump 14L and a right main pump 14R. The left main pump 14L circulates hydraulic oil to the hydraulic oil tank via the left center bypass conduit 40L or the left parallel conduit 42L. The right main pump 14R circulates hydraulic oil to the hydraulic oil tank via the right center bypass conduit 40R or the right parallel conduit 42R.

The left center bypass conduit 40L is a hydraulic oil line passing through the directional control valves 171, 173, 175L and 176L placed in the control valve unit 17. The right center bypass conduit 40R is a hydraulic oil line passing through the directional control valves 172, 174, 175R and 176R placed in the control valve unit 17.

The directional control valve 171 is a spool valve that switches the flow of hydraulic oil in order to supply hydraulic oil discharged by the left main pump 14L to the left travel hydraulic motor 2ML and to discharge hydraulic oil discharged by the left travel hydraulic motor 2ML to the hydraulic oil tank.

The directional control valve 172 is a spool valve that switches the flow of hydraulic oil in order to supply hydraulic oil discharged by the right main pump 14R to the right travel hydraulic motor 2MR and to discharge hydraulic oil discharged by the right travel hydraulic motor 2MR to the hydraulic oil tank.

The directional control valve 173 is a spool valve that switches the flow of hydraulic oil in order to supply hydraulic oil discharged by the left main pump 14L to the swing hydraulic motor 2A and to discharge hydraulic oil discharged by the swing hydraulic motor 2A to the hydraulic oil tank.

The directional control valve 174 is a spool valve that switches the flow of hydraulic oil in order to supply hydraulic oil discharged by the right main pump 14R to the bucket cylinder 9 and to discharge hydraulic oil in the bucket cylinder 9 to the hydraulic oil tank.

The directional control valve 175L is a spool valve that switches the flow of hydraulic oil in order to supply hydraulic oil discharged by the left main pump 14L to the boom cylinder 7. The directional control valve 175R is a spool valve that switches the flow of hydraulic oil in order to supply hydraulic oil discharged by the right main pump 14R to the boom cylinder 7 and to discharge hydraulic oil in the boom cylinder 7 to the hydraulic oil tank.

The directional control valve 176L is a spool valve that switches the flow of hydraulic oil in order to supply hydraulic oil discharged by the left main pump 14L to the arm cylinder 8 and to discharge hydraulic oil in the arm cylinder 8 to the hydraulic oil tank.

The directional control valve 176R is a spool valve that switches the flow of hydraulic oil in order to supply hydraulic oil discharged by the right main pump 14R to the aim cylinder 8 and to discharge hydraulic oil in the arm cylinder 8 to the hydraulic oil tank.

The left parallel conduit 42L is a hydraulic oil line that runs parallel to the left center bypass conduit 40L. The left parallel conduit 42L is configured to be able to supply hydraulic oil to a control valve further downstream when the flow of hydraulic oil through the left center bypass conduit 40L is restricted or blocked by any of the directional control valves 171, 173 and 175L. The right parallel conduit 42R is a hydraulic oil line that runs parallel to the right center bypass conduit 40R. The right parallel conduit 42R is configured to be able to supply hydraulic oil to a control valve further downstream when the flow of hydraulic oil through the right center bypass conduit 40R is restricted or blocked by any of the directional control valves 172, 174 and 175R.

The control valve 177 is configured to have a variable opening area. According to this embodiment, the control valve 177 is a spool valve placed in the left parallel conduit 42L, and is configured to be able to adjust the flow area of the left parallel conduit 42L. Specifically, the control valve 177 is positioned downstream of a branch point BP1 in the left parallel conduit 42L, in order that the flow rate of hydraulic oil flowing into the arm cylinder 8 through the directional control valve 176L is adjusted by the control valve 177. The branch point BP1 is a point at which a conduit CD1 connecting the left parallel conduit 42L and the directional control valve 175L branches from the left parallel conduit 42L. The control valve 177 may be provided upstream of the branch point BP1 and downstream of a branch point BP2 in the left parallel conduit 42L. In this case, the control valve 177 can control the flow rate of hydraulic oil flowing into the boom cylinder 7 through the directional control valve 175L. The branch point BP2 is a point at which a conduit CD2 connecting the left parallel conduit 42L and the directional control valve 173 branches from the left parallel conduit 42L.

Furthermore, the control valve 177 is positioned upstream of a junction JP1 in a conduit CD3 connecting the directional control valve 176R and the bottom-side oil chamber of the arm cylinder 8, in order to prevent the flow of hydraulic oil flowing from the right main pump 14R into the bottom-side oil chamber of the arm cylinder 8 through the directional control valve 176R from being restricted by the control valve 177. The junction JP1 is a point at which hydraulic oil flowing from the right main pump 14R into the bottom-side oil chamber of the arm cylinder 8 through the directional control valve 176R and hydraulic oil flowing from the left main pump 14L into the bottom-side oil chamber of the arm cylinder 8 through the directional control valve 176L meet.

The solenoid valve 50 is configured to be able to cause the control valve 177 to operate. According to this embodiment, the solenoid valve 50 is an electromagnetic proportional valve that operates in response to a control command (for example, a current command) from the controller 30, and is placed in a conduit CD4 that is a pilot line connecting the control valve 177 and the pilot pump 15. The solenoid valve 50 is configured to be able to adjust a control pressure acting on the pilot port of the control valve 177 to multiple levels using hydraulic oil discharged by the pilot pump 15. The solenoid valve 50 may be configured to adjust a control pressure acting on the pilot port of the control valve 177 in a stepless manner.

According to this embodiment, the control valve 177 is a spool valve of an electromagnetic pilot type configured to reduce its opening area as a control pressure generated by the solenoid valve 50 increases. The control valve 177, however, may be a spool valve of a hydraulic pilot type or a spool valve of an electromagnetic solenoid type. In the case of a spool valve of an electromagnetic solenoid type, the solenoid valve 50 is omitted.

The regulator 13 includes a left regulator 13L and a right regulator 13R. The left regulator 13L controls the discharge quantity of the left main pump 14L by adjusting the swash plate tilt angle of the left main pump 14L in accordance with the discharge pressure of the left main pump 14L. Specifically, for example, the left regulator 13L reduces the discharge quantity of the left main pump 14L by adjusting its swash plate tilt angle as the discharge pressure of the left main pump 14L increases. The same is the case with the right regulator 13R. This is for preventing the absorbed power (for example, the absorbed horsepower) of the main pump 14 expressed as the product of discharge pressure and discharge quantity from exceeding the output power (for example, the output horsepower) of the engine 11.

The operating device 26 includes a left operating lever 26L, a right operating lever 26R, and travel levers 26D. The travel levers 26D include a left travel lever 26DL and a right travel lever 26DR.

The left operating lever 26L is used for swing operation and for operating the aim 5. The left operating lever 26L is operated forward or backward to cause a control pressure commensurate with the amount of lever operation to act on a pilot port of the directional control valve 176, using hydraulic oil discharged by the pilot pump 15. Furthermore, the left operating lever 26L is operated rightward or leftward to cause a control pressure commensurate with the amount of lever operation to act on a pilot port of the directional control valve 173, using hydraulic oil discharged by the pilot pump 15.

Specifically, the left operating lever 26L is operated in an arm closing direction to introduce hydraulic oil to the right pilot port of the directional control valve 176L and introduce hydraulic oil to the left pilot port of the directional control valve 176R. Furthermore, the left operating lever 26L is operated in an arm opening direction to introduce hydraulic oil to the left pilot port of the directional control valve 176L and introduce hydraulic oil to the right pilot port of the directional control valve 176R. Furthermore, the left operating lever 26L is operated in a counterclockwise swing direction to introduce hydraulic oil to the left pilot port of the directional control valve 173, and is operated in a clockwise swing direction to introduce hydraulic oil to the right pilot port of the directional control valve 173.

The right operating lever 26R is used to operate the boom 4 and to operate the bucket 6. The right operating lever 26R is operated forward or backward to cause a control pressure commensurate with the amount of lever operation to act on a pilot port of the directional control valve 175, using hydraulic oil discharged by the pilot pump 15. Furthermore, the right operating lever 26R is operated rightward or leftward to cause a control pressure commensurate with the amount of lever operation to act on a pilot port of the directional control valve 174, using hydraulic oil discharged by the pilot pump 15.

Specifically, the right operating lever 26R is operated in a boom lowering direction to introduce hydraulic oil to the right pilot port of the directional control valve 175R. Furthermore, the right operating lever 26R is operated in a boom raising direction to introduce hydraulic oil to the right pilot port of the directional control valve 175L and to introduce hydraulic oil to the left pilot port of the directional control valve 175R. Furthermore, the right operating lever

26R is operated in a bucket closing direction to introduce hydraulic oil to the left pilot port of the directional control valve 174, and is operated in a bucket opening direction to introduce hydraulic oil to the right pilot port of the directional control valve 174.

The travel levers 26D are used to operate the crawlers 10. Specifically, the left travel lever 26DL is used to operate the left crawler 1CL. The left travel lever 26DL may be configured to operate together with a left travel pedal. The left travel lever 26DL is operated forward or backward to cause a control pressure commensurate with the amount of lever operation to act on a pilot port of the directional control valve 171, using hydraulic oil discharged by the pilot pump 15. The right travel lever 26DR is used to operate the right crawler 1CR. The right travel lever 26DR may be configured to operate together with a right travel pedal. The right travel lever 26DR is operated forward or backward to cause a control pressure commensurate with the amount of lever operation to act on a pilot port of the directional control valve 172, using hydraulic oil discharged by the pilot pump 15.

The discharge pressure sensor 28 includes a discharge pressure sensor 28L and a discharge pressure sensor 28R. The discharge pressure sensor 28L detects the discharge pressure of the left main pump 14L, and outputs a detected value to the controller 30. The same is the case with the discharge pressure sensor 28R.

The operating pressure sensor 29 includes operating pressure sensors 29LA, 29LB, 29RA, 29RB, 29DL and 29DR. The operating pressure sensor 29LA detects the details of the operator's forward or backward operation of the left operating lever 26L in the form of pressure, and outputs a detected value to the controller 30. Examples of the details of operation include the direction of lever operation and the amount of lever operation (the angle of lever operation).

Likewise, the operating pressure sensor 29LB detects the details of the operator's rightward or leftward operation of the left operating lever 26L in the form of pressure, and outputs a detected value to the controller 30. The operating pressure sensor 29RA detects the details of the operator's forward or backward operation of the right operating lever 26R in the form of pressure, and outputs a detected value to the controller 30. The operating pressure sensor 29RB detects the details of the operator's rightward or leftward operation of the right operating lever 26R in the form of pressure, and outputs a detected value to the controller 30. The operating pressure sensor 29DL detects the details of the operator's forward or backward operation of the left travel lever 26DL in the form of pressure, and outputs a detected value to the controller 30. The operating pressure sensor 29DR detects the details of the operator's forward or backward operation of the right travel lever 26DR in the form of pressure, and outputs a detected value to the controller 30.

The controller 30 receives the output of the operating pressure sensor 29, and outputs a control command to the regulator 13 to change the discharge quantity of the main pump 14 on an as-needed basis. Furthermore, the controller 30 receives the output of a control pressure sensor 19 provided upstream of a throttle 18, and outputs a control command to the regulator 13 to change the discharge quantity of the main pump 14 on an as-needed basis. The throttle 18 includes a left throttle 18L and a right throttle 18R. The control pressure sensor 19 includes a left control pressure sensor 19L and a right control pressure sensor 19R.

The left throttle 18L is placed between the most downstream control valve 176L and the hydraulic oil tank in the left center bypass conduit 40L. Therefore, the flow of hydraulic oil discharged by the left main pump 14L is restricted by the left throttle 18L. The left throttle 18L generates a control pressure for controlling the left regulator 13L. The left control pressure sensor 19L is a sensor for detecting this control pressure, and outputs a detected value to the controller 30. The controller 30 controls the discharge quantity of the left main pump 14L by adjusting the swash plate tilt angle of the left main pump 14L in accordance with this control pressure. The controller 30 decreases the discharge quantity of the left main pump 14L as this control pressure increases, and increases the discharge quantity of the left main pump 14L as this control pressure decreases. The discharge quantity of the right main pump 14R is controlled in the same manner.

Specifically, when the hydraulic system is in a standby state where none of the hydraulic actuators is operated in the shovel 100 as illustrated in FIG. 3, hydraulic oil discharged by the left main pump 14L arrives at the left throttle 18L through the left center bypass conduit 40L. The flow of hydraulic oil discharged by the left main pump 14L increases the control pressure generated upstream of the left throttle 18L. As a result, the controller 30 decreases the discharge quantity of the left main pump 14L to a minimum allowable discharge quantity to reduce pressure loss (pumping loss) during the passage of the hydraulic oil discharged by the left main pump 14L through the left center bypass conduit 40L. In contrast, when any of the hydraulic actuators is operated, hydraulic oil discharged by the left main pump 14L flows into the operated hydraulic actuator via a directional control valve corresponding to the operated hydraulic actuator. The flow of hydraulic oil discharged by the left main pump 14L that arrives at the left throttle 18L is reduced in amount or lost, so that the control pressure generated upstream of the left throttle 18L is reduced. As a result, the controller 30 increases the discharge quantity of the left main pump 14L to cause sufficient hydraulic oil to flow into the operated hydraulic actuator to ensure driving of the operated hydraulic actuator. The controller 30 controls the discharge quantity of the right main pump 14R in the same manner.

According to the configuration as described above, the hydraulic system of FIG. 3 can reduce unnecessary energy consumption in the main pump 14 in the standby state. The unnecessary energy consumption includes pumping loss that hydraulic oil discharged by the main pump 14 causes in the center bypass conduit 40. Furthermore, in the case of actuating a hydraulic actuator, the hydraulic system of FIG. 3 can ensure that necessary and sufficient hydraulic oil is supplied from the main pump 14 to the hydraulic actuator to be actuated.

Next, the information obtaining part 30*a* and the control part 30*b*, which are functional elements of the controller 30, are described. The information obtaining part 30*a* is configured to obtain information on the shovel 100. According to this embodiment, the information obtaining part 30*a* is configured to obtain information on the work details of the shovel 100 from at least one of the boom angle sensor S1, the arm angle sensor S2, the bucket angle sensor S3, the machine body tilt sensor S4, the swing angular velocity sensor S5, a cylinder pressure sensor, a swing pressure sensor, a travel pressure sensor, a boom cylinder stroke sensor, an arm cylinder stroke sensor, a bucket cylinder stroke sensor, the discharge pressure sensor 28, the operating pressure sensor 29, the space recognition device 70, the orientation detector 71, the information input device 72, the positioning device 73, and a communications device. The cylinder pressure sensor includes at least one of, for example, a boom rod pressure sensor, a boom bottom pressure sensor, an arm rod pressure sensor, an arm bottom pressure sensor, a bucket rod pressure sensor, and a bucket bottom pressure sensor.

The information on the work details of the shovel 100 includes, for example, information on work that the shovel 100 is performing. Examples of work that the shovel 100 is performing include swing and press excavation, aerial arm closing and swinging, aerial arm opening and swinging, aerial boom raising and swinging, aerial boom lowering and swinging, aerial bucket closing and swinging, and aerial bucket opening and swinging. The aerial atm closing and swinging is the motion of swinging the upper swing structure 3 while closing the arm 5 in the air. The same applies to the aerial arm opening and swinging, the aerial boom raising and swinging, the aerial boom lowering and swinging, the aerial bucket closing and swinging, the aerial bucket opening and swinging, etc.

The information obtaining part 30*a*, for example, as the information on the work details of the shovel 100, obtains at least one of the boom angle, the arm angle, the bucket angle, a machine body tilt angle, swing angular velocity, a boom rod pressure, a boom bottom pressure, an arm rod pressure, an arm bottom pressure, a bucket rod pressure, a bucket bottom pressure, a swing pressure, a travel pressure, a boom stroke amount, an arm stroke amount, a bucket stroke amount, the discharge pressure of the main pump 14, the operating pressure of the operating device 26, information on an object present in a three-dimensional space surrounding the shovel 100, information on the relative relationship between the orientation of the upper swing structure 3 and the orientation of the lower traveling structure 1, information input to the controller 30, and information on a current position.

The control part 30*b* is configured to be able to control the motion of the shovel 100 based on the information on the work details of the shovel 100. According to this embodiment, the control part 30*b* is configured to be able to adjust the opening area of the control valve 177 to a value suitable for the swing and press excavation during the swing and press excavation. Furthermore, the control part 30*b* is configured to be able to adjust the opening area of the control valve 177 to a value suitable for the aerial arm closing and swinging during the aerial arm closing and swinging.

Figure 4:
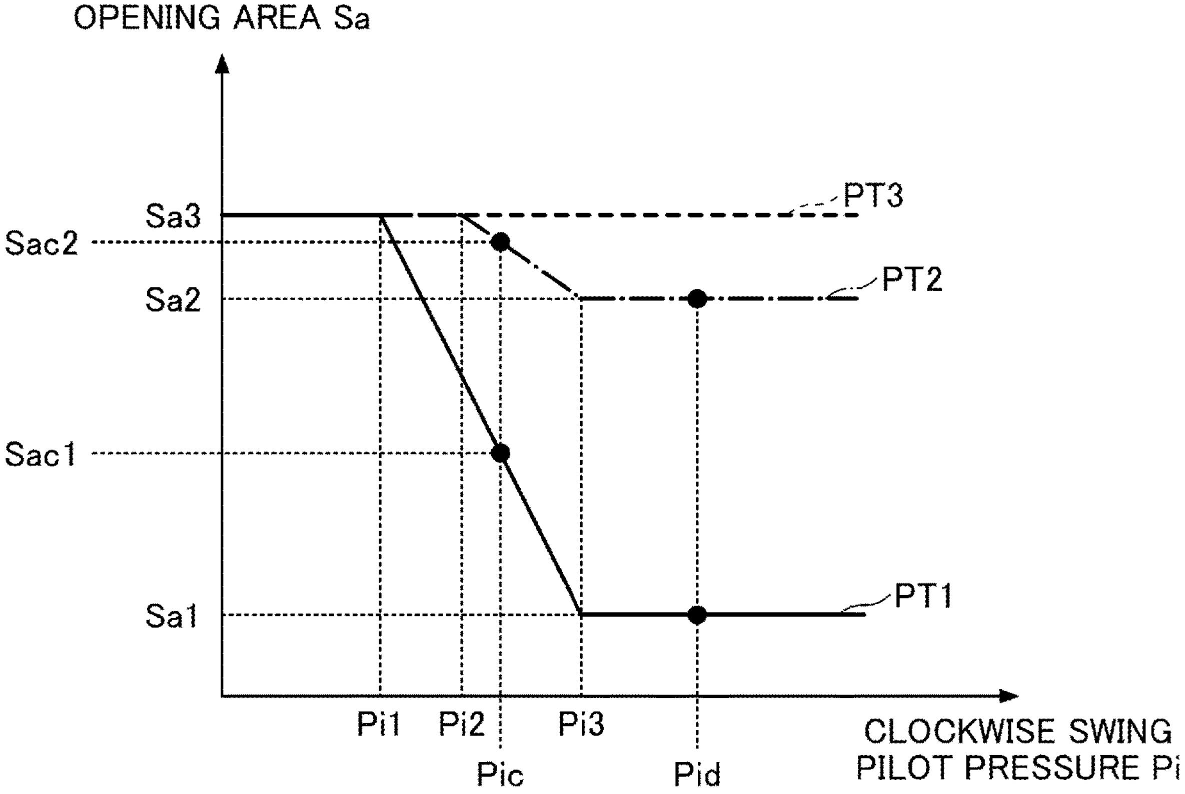
FIG. 4 is a graph illustrating a relationship between a clockwise swing pilot pressure and the opening area of a control valve.
Figure 5:
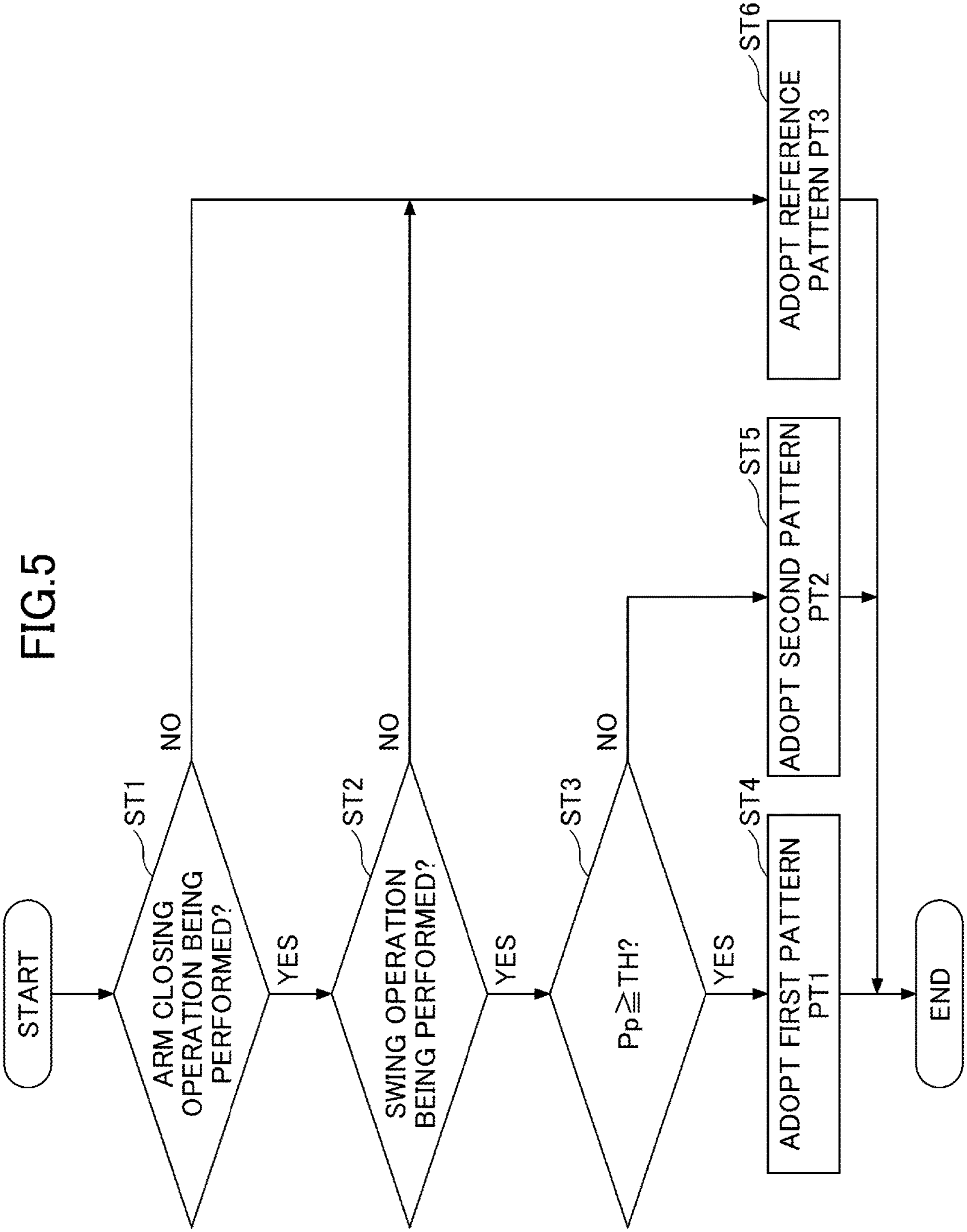
FIG. 5 is a flowchart of an example of an adjustment process.

Here, control performed by the control part 30*b* when a complex operation including an arm closing operation and a clockwise swing operation has been performed is described in detail with reference to FIGS. 4 and 5. FIG. 4 illustrates a relationship between a clockwise swing pilot pressure Pi that acts on the right pilot port of the directional control valve 173 and an opening area Sa of the control valve 177. FIG. 5 is a flowchart of an example of the process of adjusting the opening area Sa of the control valve 177 by the controller 30 (hereinafter "adjustment process"). The controller 30 repeatedly executes this adjustment process at predetermined control intervals.

First, the controller 30 determines whether an arm closing operation is being performed (step ST1). According to this embodiment, the control part 30*b* of the controller 30 determines whether an arm closing operation is being performed based on the output of the operating pressure sensor 29LA serving as the information obtaining part 30*a*. In the case where an electric operating lever is employed, the controller 30 determines whether an arm closing operation is being performed based on an electrical signal output by the left operating lever 26L.

In response to determining that an arm closing operation is being performed (YES at step ST1), the controller 30 determines whether a swing operation is being performed (step ST2). According to this embodiment, the control part 30*b* of the controller 30 determines whether a swing operation is being performed based on the output of the operating pressure sensor 29LB serving as the information obtaining part 30*a*. In the case where an electric operating lever is employed, the controller 30 determines whether a swing operation is being performed based on an electrical signal output by the left operating lever 26L.

In response to determining that a swing operation is being performed (YES at step ST2), the controller 30 determines whether a discharge pressure Pp of the left main pump 14L is more than or equal to a predetermined threshold TH (step ST3). According to this embodiment, in response to determining that a swing operation is being performed, namely, in response to determining that a complex operation including an arm closing operation and a swing operation is being performed, the control part 30*b* of the controller 30 executes step ST3. Specifically, the control part 30*b* determines whether the discharge pressure Pp of the left main pump 14L is more than or equal to the threshold TH based on the output of the discharge pressure sensor 28L serving as the information obtaining part 30*a*. The threshold TH is prestored in the NVRAM.

While the controller 30 performs the determination of step ST2 after performing the determination of step ST1 according to this embodiment, the order of step ST1 and step ST2 is random. That is, the controller 30 may perform the determination of step ST1 after performing the determination of step ST2, or may perform the determination of step ST1 and the determination of step ST2 simultaneously. Furthermore, the determination of step ST1 may be omitted.

In response to determining that the discharge pressure Pp of the left main pump 14L is more than or equal to the predetermined threshold TH (YES at step ST3), the controller 30 adopts a first pattern PT1 as the transition pattern of the opening area Sa of the control valve 177 (step ST4). According to this embodiment, in response to determining that the discharge pressure Pp of the left main pump 14L is more than or equal to the predetermined threshold TH, the control part 30*b* of the controller 30 determines that the swing and press excavation is being performed. Then, the control part 30*b*, for example, outputs a control command to the solenoid valve 50 to reduce the opening area of the control valve 177 to a value suitable for the swing and press excavation (a value determined by the first pattern PT1).

The transition pattern of the opening area Sa of the control valve 177 is a pattern that represents the correspondence between the clockwise swing pilot pressure Pi and the opening area Sa of the control valve 177. According to this embodiment, the first pattern PT1 is a pattern indicated by a solid line in FIG. 4, and is stored in the NVRAM in such a manner as to be able to be referred to. According to the first pattern PT1, the opening area Sa is a reference value Sa3 when the clockwise swing pilot pressure Pi is less than a value Pi1, decreases to a first set value Sa1 as the clockwise swing pilot pressure Pi increases when the clockwise swing pilot pressure Pi is more than or equal to the value Pi1 and less than a value Pi3, and is the first set value Sa1 when the clockwise swing pilot pressure Pi is more than or equal to the value Pi3. The reference value Sa3 corresponds to the opening area of the control valve 177 when no swing operation is performed.

The control part 30*b* of the controller 30 determines a current clockwise swing pilot pressure Pic from the output of the operating presser sensor 29LB, and derives an opening area Sac1 corresponding to the current clockwise swing pilot pressure Pic, referring to the first pattern PT1. Then, the control part 30*b* outputs a control command corresponding to the derived opening area Sac1 to the solenoid valve 50 to adjust the opening area of the control valve 177 to the opening area Sac1. Control commands corresponding to the values of the opening area Sa are typically prestored in the NVRAM or the like.

In response to determining that the discharge pressure Pp of the left main pump 14L is less than the predetermined threshold TH (NO at step ST3), the controller 30 adopts a second pattern PT2 as the transition pattern of the opening area Sa of the control valve 177 (step ST5). According to this embodiment, in response to determining that the discharge pressure Pp of the left main pump 14L is less than the predetermined threshold TH, the control part 30*b* of the controller 30 determines that the aerial arm closing and swinging is being performed. Then, the control part 30*b*, for example, outputs a control command to the solenoid valve 50 to reduce the opening area of the control valve 177 to a value suitable for the aerial arm closing and swinging (a value determined by the second pattern PT2). The value suitable for the aerial arm closing and swinging is typically greater than the value suitable for the swing and press excavation.

According to this embodiment, the second pattern PT2 is a pattern indicated by a one-dot chain line in FIG. 4, and is prestored in the NVRAM in such a manner as to be able to be referred to. According to the second pattern PT2, the opening area Sa is the reference value Sa3 when the clockwise swing pilot pressure Pi is less than a value Pi2, decreases to a second set value Sa2 as the clockwise swing pilot pressure Pi increases when the clockwise swing pilot pressure Pi is more than or equal to the value Pi2 and less than the value Pi3, and is the second set value Sa2 when the clockwise swing pilot pressure Pi is more than or equal to the value Pi3. The control part 30*b* of the controller 30 determines the current clockwise swing pilot pressure Pic from the output of the operating presser sensor 29LB, and derives an opening area Sac2 corresponding to the current clockwise swing pilot pressure Pic, referring to the second pattern PT2. Then, the control part 30*b* outputs a control command corresponding to the derived opening area Sac2 to the solenoid valve 50 to adjust the opening area of the control valve 177 to the opening area Sac2.

In response to determining that no arm closing operation is being performed (NO at step ST1) or in response to determining that no swing operation is being performed (NO at step ST2), that is, in response to determining that no complex operation including an arm closing operation and a swing operation is being performed, the controller 30 adopts a reference pattern PT3 as the transition pattern of the opening area Sa of the control valve 177 (step ST6). According to this embodiment, in response to determining that arm closing is being performed alone, the control part 30*b* of the controller 30 outputs a control command to the solenoid valve 50 to set the opening area of the control valve 177 to a value suitable for arm closing (a value determined by the reference pattern PT3).

According to this embodiment, the reference pattern PT3 is a pattern indicated by a dashed line in FIG. 4, and is prestored in the NVRAM in such a manner as to be able to be referred to. According to the reference pattern PT3, the opening area Sa is the reference value Sa3 irrespective of the magnitude of the clockwise swing pilot pressure Pi. The control part 30*b* of the controller 30 outputs a control command corresponding to the reference value Sa3 to the solenoid valve 50 to adjust the opening area of the control valve 177 to the reference value Sa3.

Thus, the controller 30 can control the opening area Sa of the control valve 177 according to information on work details so that the shovel 100 can make movements suitable for the work details. Specifically, in response to determining that the swing and press excavation is being performed, the controller 30 can adjust the opening area Sa of the control valve 177 to a value suitable for the swing and press excavation. Furthermore, in response to determining that the aerial arm closing and swinging is being performed, the controller 30 can adjust the opening area Sa of the control valve 177 to a value suitable for the aerial arm closing and swinging.

As described above, the shovel 100 according to an embodiment of the present invention includes the lower traveling structure 1, the upper swing structure 3 swingably mounted on the lower traveling structure 1, the left main pump 14L mounted on the upper swing structure 3 as a first hydraulic pump, the excavation attachment AT attached to the upper swing structure 3 as an attachment, the swing hydraulic motor 2A as a first actuator, the arm cylinder 8 as a second actuator, the directional control attached to the upper swing structure 3 as an attachment, the swing hydraulic motor 2A as a first actuator, the arm cylinder 8 as a second actuator, the directional control valve 173 as a first directional control valve corresponding to the swing hydraulic motor 2A, the directional control valve 176L as a second directional control valve corresponding to the arm cylinder 8, the left center bypass conduit 40L as a first conduit connecting the left main pump 14L and the directional control valve 173, the left parallel conduit 42L as a second conduit connecting the left center bypass conduit 40L and the directional control valve 176L, the control valve 177 installed in the left parallel conduit 42L, and the controller 30 as a control device to control the opening area Sa of the control valve 177 according to information on work details.

According to this configuration, the shovel 100 can stabilize the shovel motion when a complex operation including a swing operation is performed. For example, the shovel 100 can stabilize the motion of the shovel 100 when the swing and press excavation or the aerial arm closing and swinging through a complex operation including an arm closing operation and a swing operation has been performed. This is because the controller 30 can control the opening area Sa of the control valve 177 to a value suitable for the swing and press excavation during the swing and press excavation and because the controller 30 can control the opening area Sa of the control valve 177 to a value suitable for the aerial arm closing and swinging during the aerial arm closing and swinging.

In other words, this is because the controller 30 can prevent the opening area Sa of the control valve 177 from being adjusted to a value suitable for the swing and press excavation during the aerial arm closing and swinging. When the opening area Sa of the control valve 177 is adjusted to a value suitable for the swing and press excavation during the aerial arm closing and swinging, the flow rate of hydraulic oil toward the bottom-side oil chamber of the arm cylinder 8 may be insufficient. This is because the flow rate of hydraulic oil toward the bottom-side oil chamber of the arm cylinder 8 is restricted by the control valve 177, although the volume of the bottom-side oil chamber of the arm cylinder 8 tends to increase because the arm 5 is falling in a closing direction because of its own weight. According to the above-described configuration, the shovel 100 can prevent the occurrence of such insufficiency.

The second actuator is an actuator to move the attachment, and may be the boom cylinder 7. In this case, the second directional control valve may be the directional control valve 175L.

The left parallel conduit 42L as the second conduit is configured to connect a portion of the left center bypass conduit 40L as the first conduit upstream of the directional control valve 173 as the first directional control valve to the directional control valve 176L as the second directional control valve. That is, the left parallel conduit 42L as the second conduit is configured to allow hydraulic oil discharged by the left main pump 14L to avoid passing through and bypass the directional control valve 173 as the first directional control valve.

Desirably, the controller 30 is configured to determine the work details based on the discharge pressure Pp of the left main pump 14L. For example, when a complex operation including an arm closing operation and a swing operation is being performed, the controller 30 determines that the swing and press excavation is being performed if the discharge pressure Pp is the predetermined threshold TH, and determines that the aerial arm closing and swinging is being performed if the discharge pressure Pp is less than the predetermined threshold TH. According to this configuration, the controller 30 can easily determine the work details of the shovel 100. The controller 30, however, may determine the work details based on at least one of the output value of the pose detector that detects the pose of the attachment, an image captured by a camera serving as the front sensor 70F, and the output value of the cylinder pressure sensor.

The controller 30 may set the opening area Sa of the control valve 177 to the first set value Sa1 smaller than the predetermined reference value Sa3 if a load related to a swing actuator or an attachment actuator is more than or equal to a predetermined threshold during a complex operation including a swing operation and an operation of the attachment. The load related to a swing actuator or an attachment actuator may be detected or calculated as a load on the main pump 14 or may be detected or calculated as a load on the engine 11. For example, when the discharge pressure of the left main pump 14L is more than or equal to the predetermined threshold TH during a complex operation including a swing operation and an arm closing operation, so that it is determined that the swing and press excavation is being performed, the controller 30 may set the opening area Sa when the clockwise swing pilot pressure Pi is a value Pid to the first set value Sa1 as illustrated in FIG. 4.

According to this configuration, the controller 30 can increase the flow rate and the pressure of hydraulic oil toward the swing hydraulic motor 2A by setting the opening area Sa of the control valve 177 to the first set value Sa1 to restrict the flow of hydraulic oil toward the bottom-side oil chamber of the arm cylinder 8. Therefore, the controller 30 can prevent a large part of hydraulic oil discharged by the left main pump 14L from flowing into the bottom-side oil chamber of the arm cylinder 8 to excessively reduce the flow rate of hydraulic oil toward the swing hydraulic motor 2A during the swing and press excavation. As a result, the operator of the shovel 100 can smoothly perform the swing and press excavation.

The controller 30 may set the opening area Sa of the control valve 177 to the second set value Sa2, which is smaller than the reference value Sa3 and greater than the first set value Sa1, if the load related to the swing actuator or the attachment actuator is less than the predetermined threshold during the complex operation including the swing operation and the operation of the attachment. For example, when the discharge pressure of the left main pump 14L is less than the predetermined threshold TH during a complex operation including a swing operation and an arm closing operation, so that it is determined that the aerial arm closing and swinging is being performed, the controller 30 may set the opening area Sa when the clockwise swing pilot pressure Pi is the value Pid to the second set value Sa2 as illustrated in FIG. 4.

According to this configuration, the controller 30 can prevent the flow of hydraulic oil toward the bottom-side oil chamber of the aim cylinder 8 from being excessively restricted during the aerial arm closing and swinging. Therefore, the controller 30 can prevent the flow rate of hydraulic oil toward the bottom-side oil chamber of the arm cylinder 8 from being excessively reduced during the aerial arm closing and swinging. As a result, the operator of the shovel 100 can smoothly perform the aerial arm closing and swinging.

The reference value Sa3 is desirably the opening area of the control valve 177 when no swing operation is being performed. Accordingly, the second set value Sa2 is a value greater than the opening area during the swing and press excavation but smaller than the opening area when no swing operation is being performed, namely, during the aerial aim closing in which an arm closing operation is being performed alone.

Therefore, the controller 30 can perform the aerial arm closing and swinging with the flow of hydraulic oil toward the bottom-side oil chamber of the arm cylinder 8 being restricted compared with the case of the aerial arm closing but being less restricted than in the case of the swing and press excavation. As a result, the controller 30 can cause an appropriate amount of hydraulic oil to flow into each of the swing hydraulic motor 2A and the arm cylinder 8 at an appropriate pressure during the aerial arm closing and swinging and can improve the operability during the aerial arm closing and swinging.

The attachment actuator may also be the boom cylinder 7 or the bucket cylinder 9. In this case, the swing and press excavation may be excavation achieved by moving the boom 4 while pressing the side of the bucket 6 against an object of excavation through a complex operation including a swing operation and a boom raising operation or a boom lowering operation. The controller 30 may be configured to be able to distinguish between this swing and press excavation and the aerial boom raising and swinging or the aerial boom lowering and swinging. The swing and press excavation may also be excavation achieved by moving the bucket 6 while pressing the side of the bucket 6 against an object of excavation through a complex operation including a swing operation and a bucket closing operation or a bucket opening operation. The controller 30 may be configured to be able to distinguish between this swing and press excavation and the aerial bucket closing and swinging or the aerial bucket opening and swinging. The swing and press excavation may also be excavation achieved by opening the arm 5 while pressing the side of the bucket 6 against an object of excavation through a complex operation including a swing operation and an arm opening operation. The controller 30 may be configured to be able to distinguish between this swing and press excavation and the aerial arm opening and swinging.

The shovel 100 desirably includes the pilot pump 15 and the solenoid valve 50. The solenoid valve 50 is placed in the conduit CD4 connecting the control valve 177 and the pilot pump 15. According to this simple configuration, the shovel 100 can stabilize the motion of the shovel 100 when a complex operation including a swing operation is performed.

The shovel 100 desirably includes the right main pump 14R as a second hydraulic pump separate from the left main pump 14L, the directional control valve 176R as a third directional control valve separate from the directional control valve 176L, corresponding to the arm cylinder 8', and the conduit CD3 connecting the arm cylinder 8 and the directional control valve 176R. The conduit CD3 incudes the junction JP1 where hydraulic oil discharged by the left main pump 14L meets hydraulic oil discharged by the right main pump 14R. The control valve 177 is positioned upstream of the junction JP1.

According to this configuration, the shovel 100 can appropriately supply hydraulic oil discharged by the left main pump 14L to the swing hydraulic motor 2A without unnecessarily restricting the flow of hydraulic oil discharged by the right main pump 14R.

An embodiment of the present invention is described above. The present invention, however, is not limited to the above-described embodiment. Various variations and substitutions may be applied to the above-described embodiment without departing from the scope of the present invention. Furthermore, separately described features may be combined to the extent that no technical contradiction is caused.

For example, the controller 30 may restrict the size of a variation in a control command to the solenoid valve 50, in order to prevent the motion of the shovel 100 from being destabilized by a sudden change in the opening area Sa of the control valve 177 when the transition pattern of the opening area Sa is switched between the first pattern PT1, the second pattern PT2, and the reference pattern PT3.

Figure 6:
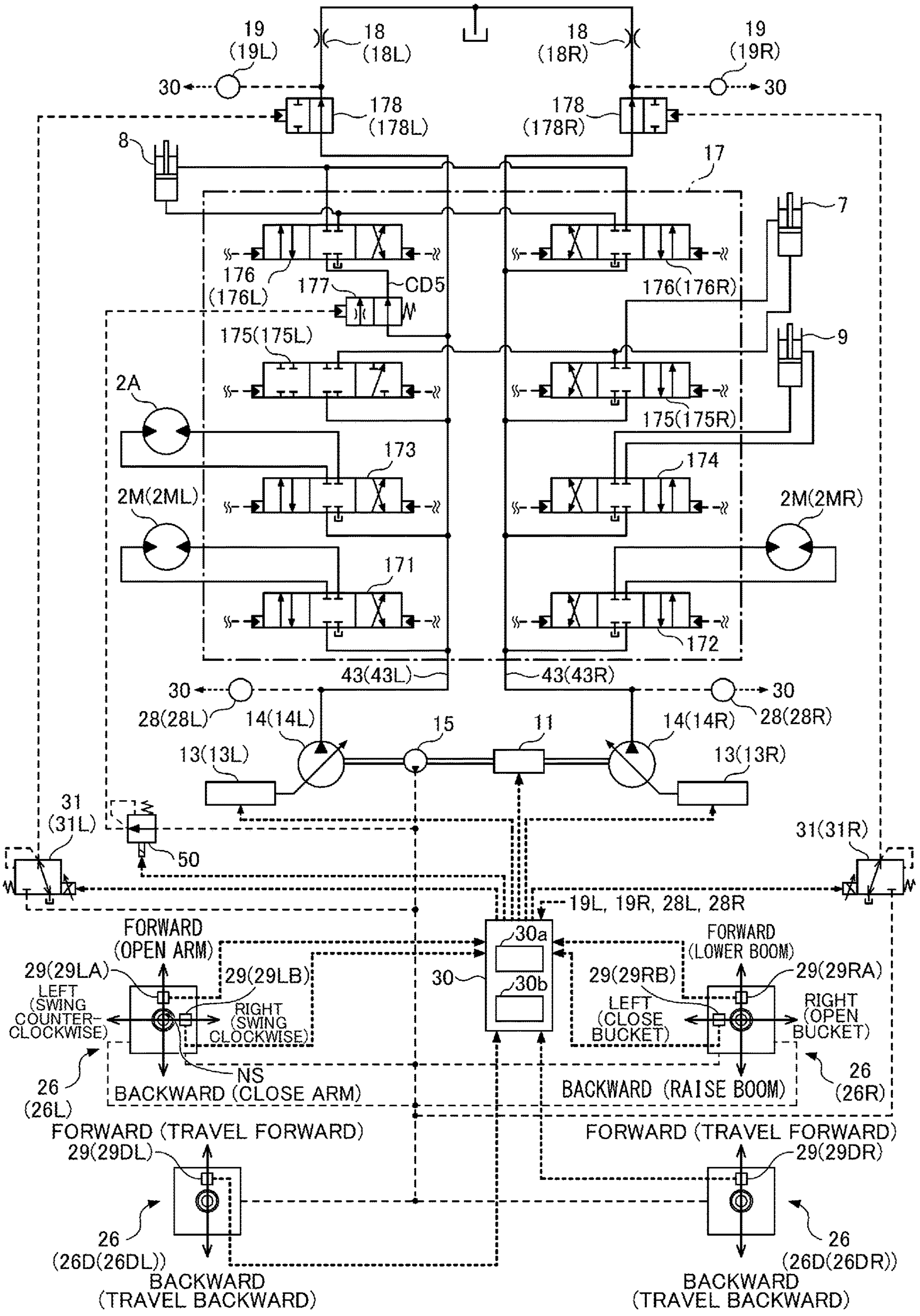
FIG. 6 is a diagram illustrating another example configuration of the hydraulic system installed in the shovel of FIG. 1.

Furthermore, the hydraulic system installed in the shovel 100 may also be configured as illustrated in FIG. 6. FIG. 6 illustrates another example configuration of the hydraulic system installed in the shovel 100. In FIG. 6, the same as in FIG. 3, a mechanical power transmission system, a hydraulic oil line, a pilot line, and an electrical control system are indicated by a double line, a solid line, a dashed line, and a dotted line, respectively.

The hydraulic system illustrated in FIG. 6 is different from the hydraulic system illustrated in FIG. 3 mainly in including a proportional valve 31, a conduit 43, and a bleed valve 178 from, but otherwise equal to the hydraulic system illustrated in FIG. 3. Therefore, in the following, the description of a common portion is omitted, and differences are described in detail.

The hydraulic system illustrated in FIG. 6 includes the conduit 43 in place of the center bypass conduit 40 and the parallel conduit 42 in the hydraulic system illustrated in FIG. 3.

The conduit 43 includes a left conduit 43L and a right conduit 43R. The left conduit 43L is a hydraulic oil line that connects the directional control valves 171, 173, 175L, and 176L placed in the control valve unit 17 in parallel between the left main pump 14L and the hydraulic oil tank. The right conduit 43R is a hydraulic oil line that connects the directional control valves 172, 174, 175R, and 176R placed in the control valve unit 17 in parallel between the right main pump 14R and the hydraulic oil tank.

The bleed valve 178 controls the flow rate of a portion of hydraulic oil discharged by the main pump 14 that flows to the hydraulic oil tank without going through any hydraulic actuator (hereinafter, "bleed flow rate"). The bleed valve 178 may be installed in the control valve unit 17.

Specifically, the bleed valve 178 is a spool valve that controls the bleed flow rate with respect to hydraulic oil discharged by the main pump 14. According to the example illustrated in FIG. 6, the bleed valve 178 includes a left bleed valve 178L and a right bleed valve 178R. The left bleed valve 178L is a spool valve that controls the bleed flow rate with respect to hydraulic oil discharged by the left main pump 14L. The right bleed valve 178R is a spool valve that controls the bleed flow rate with respect to hydraulic oil discharged by the right main pump 14R.

The bleed valve 178 is, for example, configured to be movable between a first valve position of a minimum opening area (a degree of opening of 0%) and a second valve position of a maximum opening area (a degree of opening of 100%). According to the example illustrated in FIG. 6, the bleed valve 178 is configured to be movable in a stepless manner between the first valve position and the second valve position.

The proportional valve 31 is configured to operate in response to a control command output by the controller 30. According to the example illustrated in FIG. 6, the proportional valve 31 is a solenoid valve that adjusts a secondary pressure introduced from the pilot pump 15 to the pilot port of the bleed valve 178 according to a current command output by the controller 30. The proportional valve 31, for example, operates to increase the secondary pressure introduced to the pilot port of the bleed valve 178 as the supplied current increases.

The controller 30 is configured to be able to output a current command to the proportional valve 31 to change the opening area of the bleed valve 178 on an as-needed basis.

Specifically, the proportional valve 31 is configured to be able to adjust the secondary pressure introduced from the pilot pump 15 to the pilot port of the bleed valve 178 according to a current command output by the controller 30. According to the example illustrated in FIG. 6, the proportional valve 31 includes a left proportional valve 31L and a right proportional valve 31R. The left proportional valve 31L can adjust the secondary pressure so that the left bleed valve 178L can stop at any position between the first valve position and the second valve position. The right proportional valve 31R can adjust the secondary pressure so that the right bleed valve 178R can stop at any position between the first valve position and the second valve position.

Next, negative control adopted in the hydraulic system illustrated in FIG. 6 is described. In the conduit 43, the throttle 18 is placed between the bleed valve 178, which is the most downstream spool valve, and the hydraulic oil tank. The flow of hydraulic oil arriving at the hydraulic tank through the bleed valve 178 is restricted by the throttle 18. The throttle 18 generates a control pressure for controlling the regulator 13, namely, a control pressure for controlling the discharge quantity of the main pump 14. The control pressure sensor 19 is a sensor for detecting the control pressure, and outputs a detected value to the controller 30.

According to the example illustrated in FIG. 6, the throttle 18 is a fixed throttle whose opening area does not change, and includes the left throttle 18L, placed between the left bleed valve 178L and the hydraulic oil tank in the left conduit 43L, and the right throttle 18R, placed between the right bleed valve 178R and the hydraulic oil tank in the right conduit 43R. The control pressure sensor 19 includes the left control pressure sensor 19L that detects the control pressure generated by the left throttle 18L to control the left regulator 13L and the right control pressure sensor 19R that detects the control pressure generated by the right throttle 18R to control the right regulator 13R.

The controller 30 controls the discharge quantity (geometric displacement) of the main pump 14 by adjusting the swash plate tilt angle of the main pump 14 according to the control pressure. The relationship between the control pressure and the discharge quantity of the main pump 14 is referred to as "negative control characteristic." The discharge quantity control based on the negative control characteristic, for example, may be achieved by using a reference table stored in the ROM or the like or may be achieved by performing predetermined calculations in real time. According to the example illustrated in FIG. 6, the controller 30 refers to a reference table representing a predetermined negative control characteristic to decrease the discharge quantity of the main pump 14 as the control pressure increases and increase the discharge quantity of the main pump 14 as the control pressure decreases.

Specifically, when no operating device 26 is operated and no hydraulic actuators are in operation, namely, when the hydraulic system is in the standby state, as illustrated in FIG. 6, hydraulic oil discharged by the left main pump 14L arrives at the left throttle 18L through the left bleed valve 178L. When the flow rate of the hydraulic oil arriving at the left throttle 18L is higher than or equal to a predetermined flow rate, the control pressure generated upstream of the left throttle 18L reaches a predetermined pressure. When the control pressure reaches a predetermined pressure, the controller 30 reduces the discharge quantity of the left main pump 14L to a predetermined minimum allowable discharge quantity to reduce pressure loss (pumping loss) during the passage of the discharged hydraulic oil through the left conduit 43L. This predetermined minimum allowable discharge quantity in the standby state is referred to as "standby flow rate." The controller 30 controls the discharge quantity of the right main pump 14R in the same manner.

In contrast, when any of the hydraulic actuators is operated, hydraulic oil discharged by the left main pump 14L flows into the operated hydraulic actuator via a directional control valve corresponding to the operated hydraulic actuator. The controller 30 outputs a control command to the left proportional valve 31L to reduce the opening area of the left bleed valve 178L according to the amount of movement of the directional control valve corresponding to the operated hydraulic actuator. The amount of movement of the directional control valve corresponds to a control pressure acting on a pilot port of the directional control valve. When two or more directional control valves are simultaneously moved, the controller 30 reduces the opening area of the left bleed valve 178L according to the total amount of movement of the directional control valves. The controller 30 is configured to typically reduce the opening area of the left bleed valve 178L as the total amount of movement of directional control valves increases. In this case, the flow rate of hydraulic oil arriving at the left throttle 18L through the left bleed valve 178L is reduced, so that the control pressure generated upstream of the left throttle 18L decreases. As a result, the controller 30 increases the discharge quantity of the left main pump 14L to supply sufficient hydraulic oil to the operated hydraulic actuator to ensure driving of the operated hydraulic actuator. The controller 30 controls the discharge quantity of the right main pump 14R in the same manner. The flow rate of hydraulic oil flowing into a hydraulic actuator is referred to as "actuator flow rate." The flow rate of hydraulic oil discharged by the left main pump 14L corresponds to the sum of the actuator flow rate with respect to the left conduit 43L and the bleed flow rate with respect to the left conduit 43L. The same applies to the flow rate of hydraulic oil discharged by the right main pump 14R.

According to the above-described configuration, in the case of actuating a hydraulic actuator, the hydraulic system illustrated in FIG. 6 can ensure that necessary and sufficient hydraulic oil is supplied from the main pump 14 to the hydraulic actuator to be actuated. Furthermore, the hydraulic system illustrated in FIG. 6 can reduce unnecessary consumption of hydraulic energy in the standby state. This is because the bleed flow rate can be reduced to the standby flow rate. The same is the case with the hydraulic system illustrated in FIG. 3.

According to the example illustrated in FIG. 6, the control valve 177 is placed in a conduit CD5 connecting the left conduit 43L and the directional control valve 176L.

According to this configuration, when the aerial arm closing and swinging or the swing and press excavation is performed, the controller 30 outputs a control command to the left proportional valve 31L to reduce the opening area of the left bleed valve 178L. At this point, the opening area of the left bleed valve 178L has a size corresponding to the amount of movement of the directional control valve 173 corresponding to the swing hydraulic motor 2A and the amount of movement of the directional control valve 176 corresponding to the arm cylinder 8. In response to determining that the swing and press excavation is being performed, the controller 30 outputs a control command to the solenoid valve 50 to change the opening area of the control valve 177 to a value suitable for the swing and press excavation. Therefore, in response to determining that the swing and press excavation is being performed, the controller 30 can reduce the flow rate of hydraulic oil flowing into the directional control valve 176L compared with the case of determining that the aerial arm closing and swinging is being performed. Conversely, in response to determining that the aerial arm closing and swinging is being performed, the controller 30 outputs a control command to the solenoid valve 50 to change the opening area of the control valve 177 to a value suitable for the aerial arm closing and swinging. Therefore, in response to determining that the aerial arm closing and swinging is being performed, the controller 30 can increase the flow rate of hydraulic oil flowing into the directional control valve 176L compared with the case of determining that the swing and press excavation is being performed.

According to this configuration, the hydraulic system illustrated in FIG. 6 can achieve the same effect as produced by the hydraulic system illustrated in FIG. 3. Specifically, the hydraulic system illustrated in FIG. 6 can stabilize the motion of the shovel 100 when the swing and press excavation or the aerial arm closing and swinging is performed.

Figure 7:
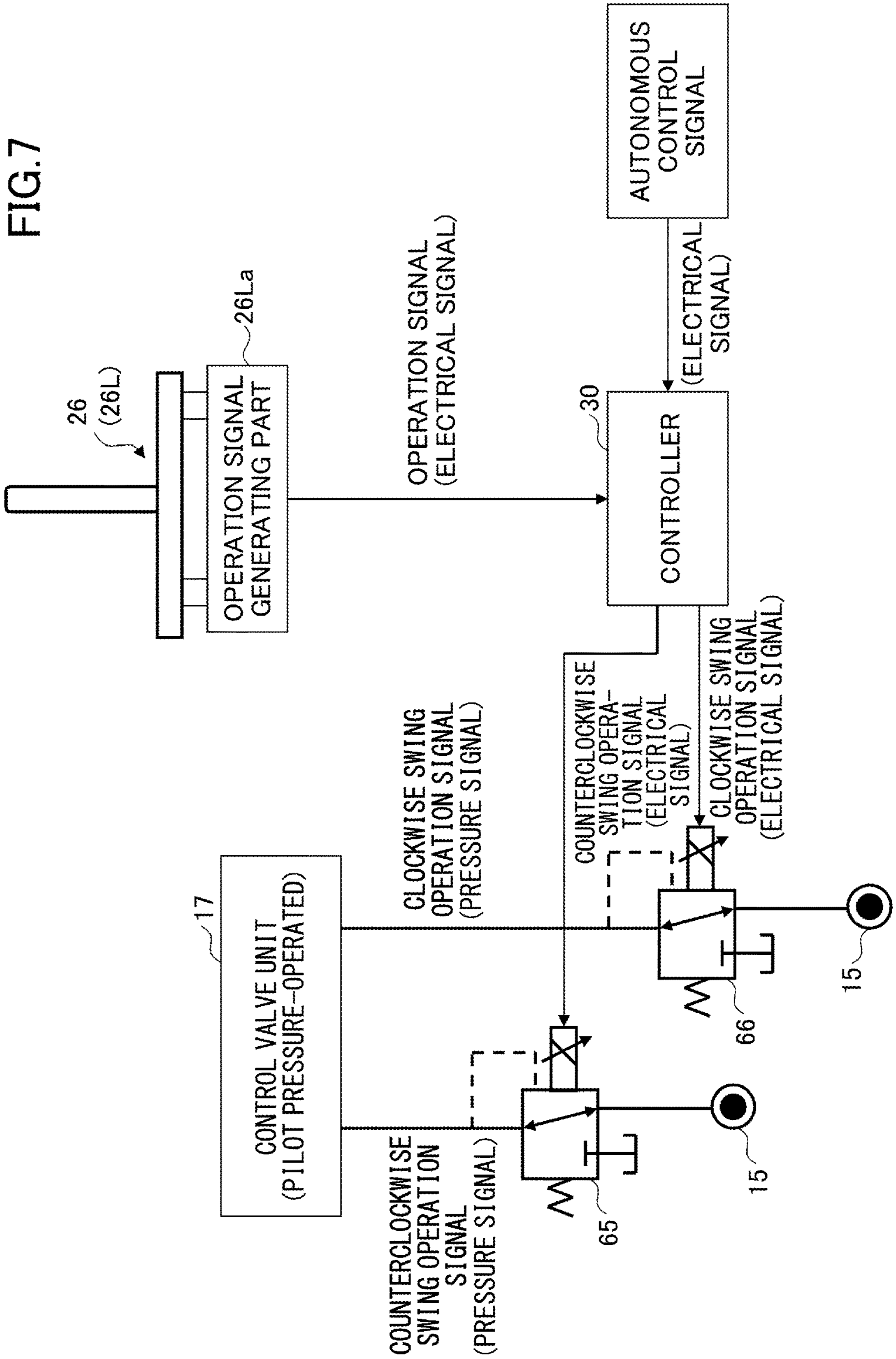
FIG. 7 is a diagram illustrating an example configuration of an electric operation system.

Furthermore, instead of a hydraulic operation system, an electric operation system may be installed in the shovel 100. FIG. 7 illustrates an example configuration of an electric operation system. Specifically, the electric operation system of FIG. 7 is an example of a swing operation system, and is constituted mainly of the pilot pressure-operated control valve unit 17, the left operating lever 26L serving as an electric operating lever, the controller 30, a solenoid valve 65 for counterclockwise swing operation, and a solenoid valve 66 for clockwise swing operation. The electric operation system of FIG. 7 may also be likewise applied to a boom operation system, an arm operation system, a bucket operation system, a travel operation system, etc.

As illustrated in FIG. 3, the pilot pressure-operated control valve unit 17 includes the directional control valve 171 associated with the left travel hydraulic motor 2ML, the directional control valve 172 associated with the right travel hydraulic motor 2MR, the directional control valve 173 associated with the swing hydraulic motor 2A, the directional control valve 174 associated with the bucket cylinder 9, the directional control valve 175 associated with the boom cylinder 7, the directional control valve 176 associated with the arm cylinder 8, etc. The solenoid valve 65 is configured to be able to adjust the flow area of a conduit connecting the pilot pump 15 and the left pilot port of the directional control valve 173. The solenoid valve 66 is configured to be able to adjust the flow area of a conduit connecting the pilot pump 15 and the right pilot port of the directional control valve 173.

When a manual operation is performed, the controller 30 generates a counterclockwise swing operation signal (electrical signal) or a clockwise swing operation signal (electrical signal) in accordance with an operation signal (electrical signal) output by an operation signal generating part 26La of the left operating lever 26L. The operation signal output by the operation signal generating part 26La of the left operating lever 26L is an electrical signal that changes according to the direction of operation and the amount of operation the left operating lever 26L.

Specifically, when the left operating lever 26L is operated in the counterclockwise swing direction, the controller 30 outputs a counterclockwise swing operation signal (electrical signal) commensurate with the amount of lever operation to the solenoid valve 65. The solenoid valve 65 adjusts the flow area in accordance with the counterclockwise swing operation signal (electrical signal) to control a pilot pressure serving as a counterclockwise swing operation signal (pressure signal) that acts on the left pilot port of the directional control valve 173. Likewise, when the left operating lever 26L is operated in the clockwise swing direction, the controller 30 outputs a clockwise swing operation signal (electrical signal) commensurate with the amount of lever operation to the solenoid valve 66. The solenoid valve 66 adjusts the flow area in accordance with the clockwise swing operation signal (electrical signal) to control a pilot pressure serving as a clockwise swing operation signal (pressure signal) that acts on the right pilot port of the directional control valve 173.

In the case of executing an autonomous control function, the controller 30, for example, generates the counterclockwise swing operation signal (electrical signal) or the clockwise swing operation signal (electrical signal) according to an autonomous control signal (electrical signal) instead of responding to the operation signal (electrical signal) output by the operation signal generating part 26La of the left operating lever 26L. The autonomous control function is a function for causing the shovel 100 to autonomously operate, and includes, for example, a function to cause a hydraulic actuator to autonomously operate independent of the details of the operator's operation of the operating device 26. The autonomous control signal may be an electrical signal generated by the controller 30 or an electrical signal generated by an external control device other than the controller 30.

Figure 8:
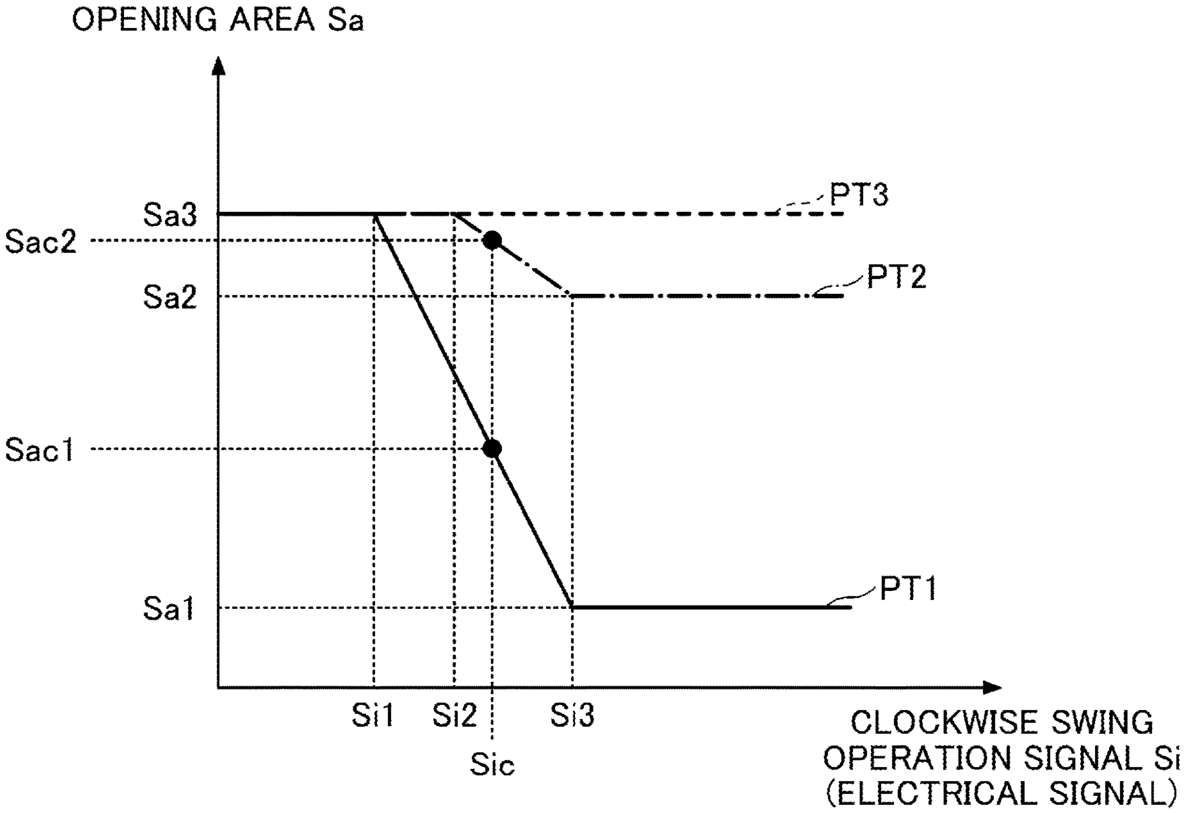
FIG. 8 is a graph illustrating a relationship between a clockwise swing operation signal and the opening area of the control valve.

Here, control executed by the control part 30*b* when a complex operation including an arm closing operation and a clockwise swing operation is performed using the electric operation system is described in detail with reference to FIG. 8. FIG. 8 is a graph illustrating a relationship between a clockwise swing operation signal (electrical signal) Si output to the solenoid valve 66 and the opening area Sa of the control valve 177, and corresponds to FIG. 4.

The same as in the case of the hydraulic operation system, in response to determining that the swing and press excavation is being performed, the control part 30*b* adopts the first pattern PT1 as the transition pattern of the opening area Sa of the control valve 177. Then, the control part 30*b* outputs a control command to the solenoid valve 50 to reduce the opening area of the control valve 177 to a value suitable for the swing and press excavation (a value determined by the first pattern PT1 of FIG. 8).

The transition pattern of the opening area Sa of the control valve 177 is a pattern that represents the correspondence between the clockwise swing operation signal (electrical signal) Si and the opening area Sa of the control valve 177. The first pattern PT1 is a pattern indicated by a solid line in FIG. 8, and is stored in the NVRAM in such a manner as to be able to be referred to. According to the first pattern PT1, the opening area Sa is the reference value Sa3 when the clockwise swing operation signal (electrical signal) Si is less than a value Si1, decreases to the first set value Sa1 as the clockwise swing operation signal (electrical signal) Si increases when the clockwise swing operation signal (electrical signal) Si is more than or equal to the value Si1 and less than a value Si3, and is the first set value Sa1 when the clockwise swing operation signal (electrical signal) Si is more than or equal to the value Si3. The reference value Sa3 corresponds to the opening area of the control valve 177 when no swing operation is being performed.

The control part 30*b* determines a current clockwise swing operation signal (electrical signal) Sic from the output of the left operating lever 26L, and derives the opening area Sac1 corresponding to the current clockwise swing operation signal (electrical signal) Sic, referring to the first pattern PT1. Then, the control part 30*b* outputs a control command corresponding to the derived opening area Sac1 to the solenoid valve 50 to adjust the opening area of the control valve 177 to the opening area Sac1. Control commands corresponding to the values of the opening area Sa are typically prestored in the NVRAM or the like.

In response to determining that the aerial arm closing and swinging is being performed, the control part 30*b* adopts the second pattern PT2 of FIG. 8 as the transition pattern of the opening area Sa of the control valve 177. Then, the control part 30*b*, for example, outputs a control command to the solenoid valve 50 to reduce the opening area of the control valve 177 to a value suitable for the aerial arm closing and swinging (a value determined by the second pattern PT2). The value suitable for the aerial arm closing and swinging is typically greater than the value suitable for the swing and press excavation.

The second pattern PT2 is a pattern indicated by a one-dot chain line in FIG. 8, and is prestored in the NVRAM in such a manner as to be able to be referred to. According to the second pattern PT2, the opening area Sa is the reference value Sa3 when the clockwise swing operation signal (electrical signal) Si is less than a value Si2, decreases to the second set value Sat as the clockwise swing operation signal (electrical signal) Si increases when the clockwise swing operation signal (electrical signal) Si is more than or equal to the value Si2 and less than the value Si3, and is the second set value Sa2 when the clockwise swing operation signal (electrical signal) Si is more than or equal to the value Si3.

The control part 30*b* determines the current clockwise swing operation signal (electrical signal) Sic from the output of the left operating lever 26L, and derives the opening area Sac2 corresponding to the current clockwise swing operation signal (electrical signal) Sic, referring to the second pattern PT2. Then, the control part 30*b* outputs a control command corresponding to the derived opening area Sac2 to the solenoid valve 50 to adjust the opening area of the control valve 177 to the opening area Sac2.

In response to determining that aim closing is being performed alone, the control part 30*b* outputs a control command to the solenoid valve 50 to set the opening area of the control valve 177 to a value suitable for arm closing (a value determined by the reference pattern PT3 of FIG. 8).

The reference pattern PT3 is a pattern indicated by a dashed line in FIG. 8, and is prestored in the NVRAM in such a manner as to be able to be referred to. According to the reference pattern PT3, the opening area Sa is the reference value Sa3 irrespective of the magnitude of the clockwise swing operation signal (electrical signal) Si. The control part 30*b* outputs a control command corresponding to the reference value Sa3 to the solenoid valve 50 to adjust the opening area of the control valve 177 to the reference value Sa3.

Thus, in the case of using the electric operation system as well, the controller 30 can control the opening area Sa of the control valve 177 according to information on work details so that the shovel 100 can make movements suitable for the work details, the same as in the case of using the hydraulic operation system. Specifically, in response to determining that the swing and press excavation is being performed, the controller 30 can adjust the opening area Sa of the control valve 177 to a value suitable for the swing and press excavation. Furthermore, in response to determining that the aerial arm closing and swinging is being performed, the controller 30 can adjust the opening area Sa of the control valve 177 to a value suitable for the aerial arm closing and swinging.

Figure 9:
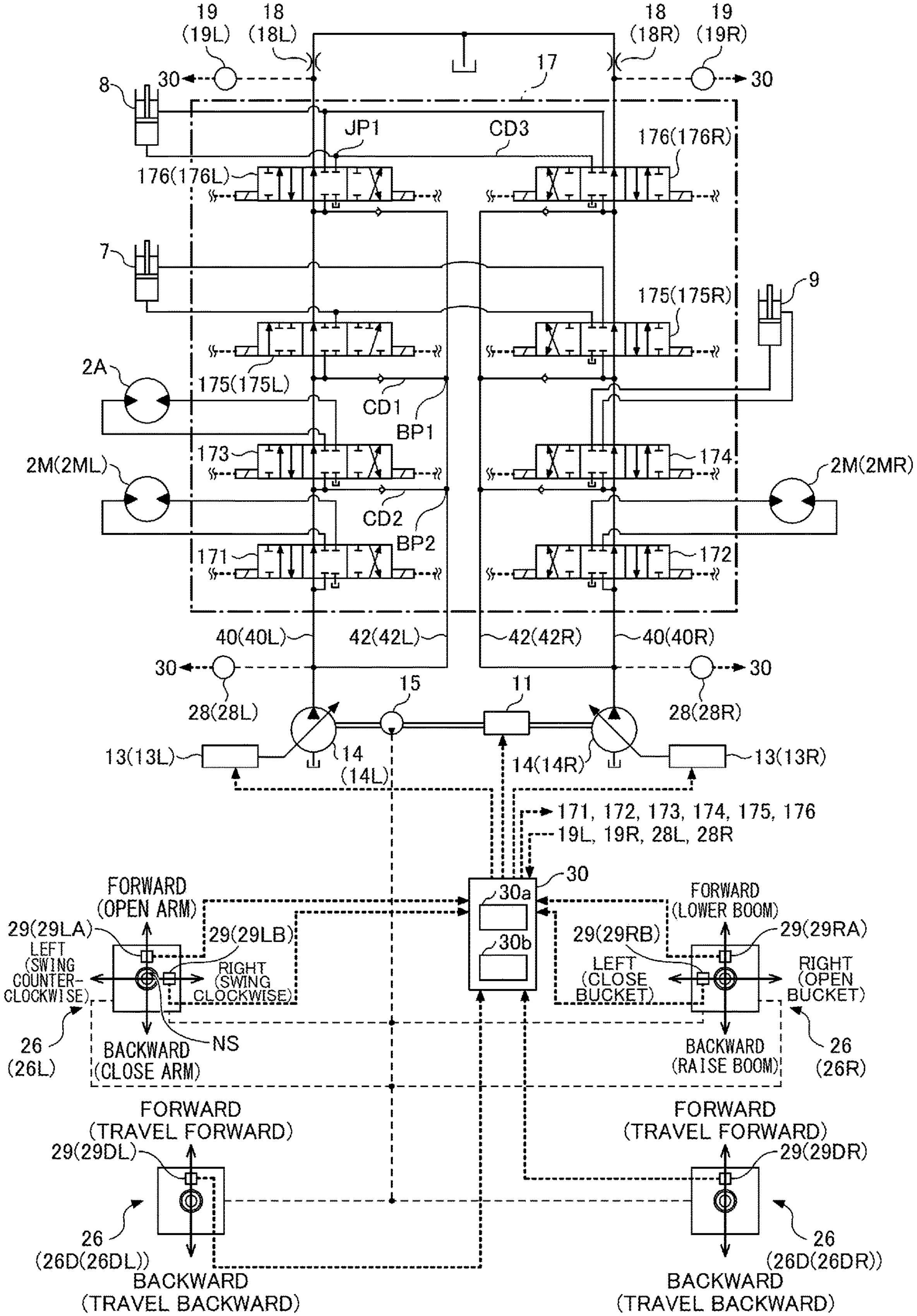
FIG. 9 is a diagram illustrating yet another example configuration of the hydraulic system installed in the shovel of FIG. 1.

Furthermore, the hydraulic system installed in the shovel 100 may also be configured as illustrated in FIG. 9. FIG. 9 illustrates yet another example configuration of the hydraulic system installed in the shovel 100. In FIG. 9, the same as in FIG. 3, a mechanical power transmission system, a hydraulic oil line, a pilot line, and an electrical control system are indicated by a double line, a solid line, a dashed line, and a dotted line, respectively.

The hydraulic system illustrated in FIG. 9 is different from the hydraulic system illustrated in FIG. 3 mainly in that an electric operation system is installed instead of a hydraulic operation system from, but otherwise equal to the hydraulic system illustrated in FIG. 3. Therefore, in the following, a description of a common portion is omitted, and differences are described in detail.

According to the hydraulic system illustrated in FIG. 9, each of the directional control valves 171 through 176 is constituted of a solenoid spool valve. Furthermore, each of the directional control valves 171 through 176 is configured to operate in response to a control signal from the controller 30. Therefore, according to the hydraulic system illustrated in FIG. 9, the solenoid valve 50, the control valve 177, and the conduit CD4 in the hydraulic system illustrated in FIG. 3 are omitted. This is because the controller 30 can cause the directional control valve 176L to operate independent of the direction of operation and the amount of operation of the left operating lever 26L.

Specifically, the controller 30 can determine the details of the work of the shovel 100 including arm closing based on an operation signal output by the operation signal generating part 26La of the left operating lever 26L. Examples of the determination of the details of work including arm closing include a determination as to whether the swing and press excavation is being performed, whether the aerial arm closing and swinging is being performed, whether the arm closing is being performed alone, etc. The controller 30 can adjust the flow rate of hydraulic oil flowing into the directional control valve 176L the same as in the case of moving the control valve 177, by moving the directional control valve 176L irrespective of the amount of operation of the left operating lever 26L according to the determination result. According to the example illustrated in FIG. 9, the controller 30 is configured such that the amount of adjustment by the directional control valve 176L is equal to the amount of adjustment by the control valve 177 in the hydraulic system illustrated in FIG. 3.

According to this configuration, the hydraulic system illustrated in FIG. 9 can achieve the same effect as the effect produced by the hydraulic system illustrated in FIG. 3.

Figure 10:
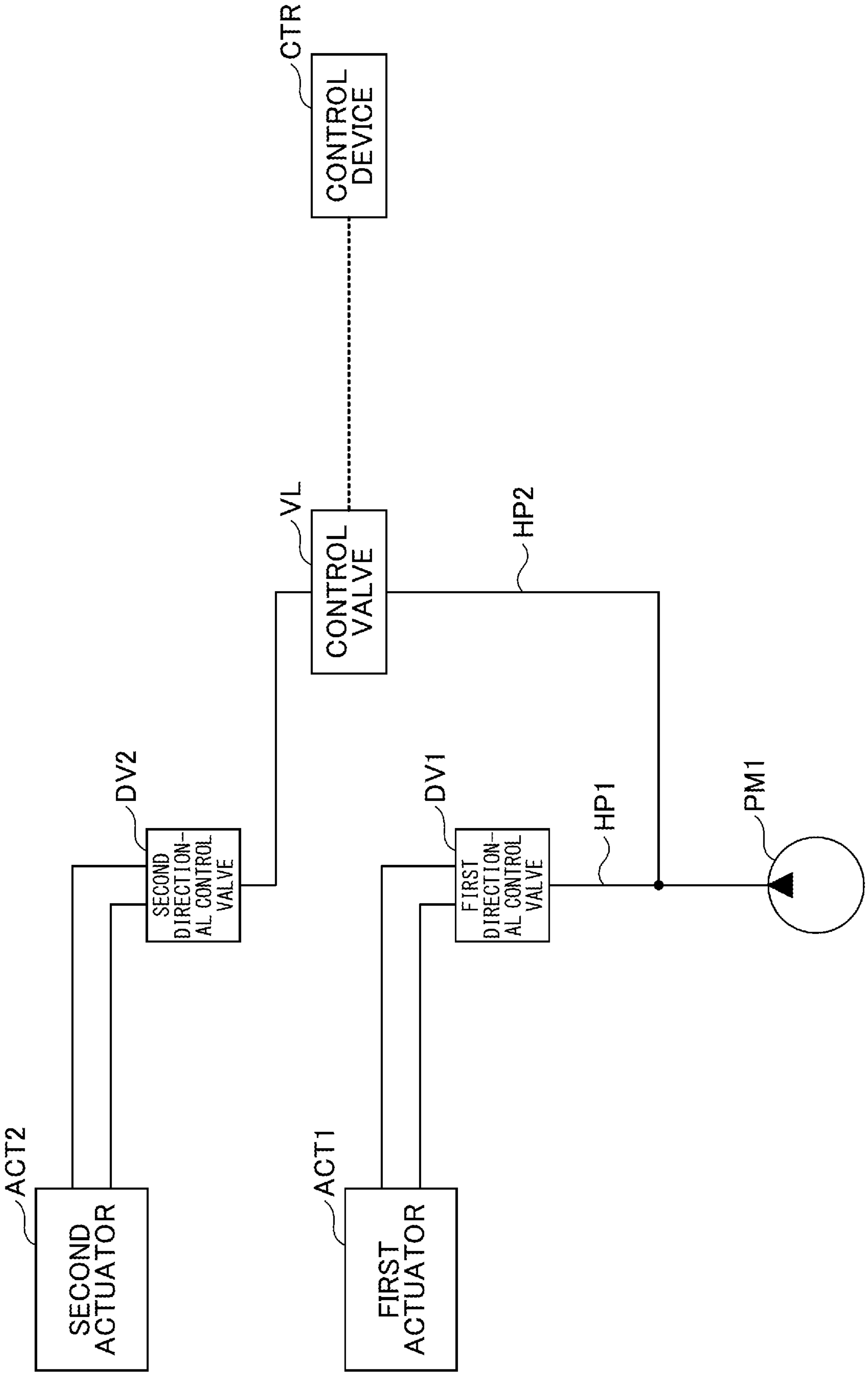
FIG. 10 is a diagram illustrating another example configuration of the shovel according to the embodiment of the present invention.

Next, another example configuration of the shovel 100 according to this embodiment is described with reference to FIG. 10. According to the example illustrated in FIG. 10, the shovel 100 includes a first hydraulic pump PM1 provided on the upper swing structure 3, a first actuator ACT1, a second actuator ACT2, a first directional control valve DV1 corresponding to the first actuator ACT1, a second directional control valve DV2 corresponding to the second actuator ACT2, a first conduit HP1 connecting the first hydraulic pump PM1 and the first directional control valve DV1, a second conduit HP2 connecting the first conduit HP1 and the second directional control valve DV2, a control valve VL installed in the second conduit HP2, and a control device CTR (an example of processing circuitry) that controls the opening area of the control valve VL according to information on work details.

The first hydraulic pump PM1 is, for example, the left main pump 14L or the right main pump 14R. The first actuator ACT1 is, for example, one of the swing hydraulic motor 2A, the travel hydraulic motors 2M, the boom cylinder 7, the arm cylinder 8, and the bucket cylinder 9, and the second actuator ACT2 is another one of the swing hydraulic motor 2A, the travel hydraulic motors 2M, the boom cylinder 7, the arm cylinder 8, and the bucket cylinder 9.

According to this configuration, the shovel 100 can stabilize its motion when a complex operation is performed. This is because, for example, when a complex operation including an operation of the first actuator ACT1 and an operation of the second actuator ACT2 has been performed, the shovel 100 can adjust the flow rate of hydraulic oil flowing into the first actuator ACT1 by adjusting the flow rate of hydraulic oil flowing into the second actuator ACT2. Specifically, for example, in the case where the first actuator ACT1 is the swing hydraulic motor 2A and the second actuator ACT2 is the arm cylinder 8, the shovel 100 can stabilize the motion of the shovel 100 when a complex operation including a swing operation, such as the swing and press excavation or the aerial arm closing and swinging, is performed. This is because it is possible to adjust the flow rate of hydraulic flowing into the swing hydraulic motor 2A by adjusting the flow rate of hydraulic oil flowing into the arm cylinder 8.

What is claimed is:

1. A shovel comprising:

a lower traveling structure;

an upper swing structure swingably mounted on the lower traveling structure;

a first hydraulic pump provided on the upper swing structure;

an attachment attached to the upper swing structure;

a first actuator;

a second actuator;

a first directional control valve corresponding to the first actuator, the first directional control valve being configured to switch a flow of hydraulic oil to supply hydraulic oil discharged by the first hydraulic pump to the first actuator and to discharge hydraulic oil discharged by the first actuator to a hydraulic oil tank;

a second directional control valve corresponding to the second actuator, the second directional control valve being configured to switch a flow of hydraulic oil to supply the hydraulic oil discharged by the first hydraulic pump to the second actuator and to discharge hydraulic oil in the second actuator to the hydraulic oil tank;

a first conduit connecting the first hydraulic pump and the first directional control valve;

a second conduit connecting the first conduit and the second directional control valve;

a control valve installed in the second conduit and configured to adjust a flow area of the second conduit; and processing circuitry configured to adopt a transition pattern from among a plurality of transition patterns that represent correspondence between an amount of operation for the first actuator and an opening area of the control valve according to information on work details and to control the opening area of the control valve according to the adopted transition pattern, wherein the processing circuitry is configured to determine whether a discharge pressure of the first hydraulic pump is more than or equal to a predetermined threshold, and to adopt a first transition pattern from among the plurality of transition patterns in response to determining that the discharge pressure of the first hydraulic pump is more than or equal to the predetermined threshold, and adopt a second transition pattern from among the plurality of transition patterns in response to determining that the discharge pressure of the first hydraulic pump is less than the predetermined threshold, a change in the opening area of the control valve relative to a change in the amount of operation for the first actuator is greater in the first transition pattern than in the second transition pattern, according to the first transition pattern, the opening area of the control valve is a reference value when a value indicating the amount of operation for the first actuator is less than a first value, decreases from the reference value to a first set value as the value indicating the amount of operation for the first actuator increases when the value indicating the mount of operation for the first actuator is more than or equal to the first value and less than a second value, and is the first set value when the value indicating the amount of operation for the first actuator is more than or equal to the second value, the reference value corresponding to the opening area of the control valve when no operation is performed for the first actuator, and according to the second transition pattern, the opening area of the control valve is the reference value when the value indicating the amount of operation for the first actuator is less than a third value, decreases from the reference value to a second set value as the value indicating the amount of operation for the first actuator increases when the value indicating the amount of operation for the first actuator is more than or equal to the third value and less than the second value, and is the second set value when the value indicating the amount of operation for the first actuator is more than or equal to the second value, the third value being greater than the first value and smaller than the second value, the second set value being greater than the first set value.

2. The shovel as claimed in claim 1, wherein the first actuator is a swing hydraulic motor provided on the upper swing structure.

3. The shovel as claimed in claim 1, wherein the second actuator is an actuator configured to move the attachment.

4. The shovel as claimed in claim 1, wherein the second conduit connects the first conduit upstream of the first directional control valve to the second directional control valve.

5. The shovel as claimed in claim 1, wherein the processing circuitry is configured to determine the work details based on the discharge pressure of the first hydraulic pump.

6. The shovel as claimed in claim 1, wherein the processing circuitry is configured to adopt the first transition pattern in response to determining that the discharge pressure of the first hydraulic pump is more than or equal to the predetermined threshold during a complex operation including a swing operation and an operation of the attachment.

7. The shovel as claimed in claim 6, wherein the processing circuitry is configured to adopt the second transition pattern in response to determining that the discharge pressure of the first hydraulic pump is less than the predetermined threshold during the complex operation including the swing operation and the operation of the attachment.

8. The shovel as claimed in claim 6, wherein the reference value is the opening area of the control valve when the swing operation is not performed.

9. The shovel as claimed in claim 1, wherein the second actuator is an arm cylinder.

10. The shovel as claimed in claim 1, further comprising:

a pilot pump; and a solenoid valve, wherein the solenoid valve is placed in a conduit connecting the control valve and the pilot pump.

11. The shovel as claimed in claim 1, further comprising:

a second hydraulic pump separate from the first hydraulic pump;

a third directional control valve separate from the second directional control valve, the third directional control valve corresponding to the second actuator; and a third conduit connecting the second actuator and the third directional control valve, wherein the third conduit includes a junction where hydraulic oil flowing from the first hydraulic pump into the second actuator through the second directional control valve meets hydraulic oil flowing from the second hydraulic pump into the second actuator through the third directional control valve, the control valve is positioned upstream of the junction, and the junction is positioned downstream of the second directional control valve.

12. The shovel as claimed in claim 1, wherein the processing circuitry is configured to determine the work details based on at least one of an output value of a pose detector configured to detect a pose of the attachment, an image captured by a camera, and an output value of a cylinder pressure sensor.

13. The shovel as claimed in claim 1, wherein the processing circuitry is configured to vary the opening area of the control valve between the reference value and the first set value in response to determining that the discharge pressure of the first hydraulic pump is more than or equal to the predetermined threshold during a complex operation including a swing operation and an operation of the attachment, and the processing circuitry is configured to vary the opening area of the control valve between the reference value and the second set value in response to determining that the discharge pressure of the first hydraulic pump is less than the predetermined threshold during the complex operation including the swing operation and the operation of the attachment.

14. The shovel as claimed in claim 1, wherein, between the first value and the second value of the amount of operation for the first actuator, the change in the opening area of the control valve relative to the change in the amount of operation for the first actuator differs between the plurality of transition patterns.

* * * * *